US011863421B2

(12) United States Patent
Kaciulis et al.

(10) Patent No.: US 11,863,421 B2
(45) Date of Patent: *Jan. 2, 2024

(54) SYSTEM AND METHOD FOR OPTIMAL MULTISERVER VPN ROUTING

(71) Applicant: Netflow, UAB, Vilnius (LT)

(72) Inventors: Karolis Kaciulis, Kaisiadorys (LT); Donatas Budvytis, Vilnius (LT)

(73) Assignee: Netflow, UAB, Vilnius (LT)

( * ) Notice: Subject to any disclaimer, the term of this patent is extended or adjusted under 35 U.S.C. 154(b) by 0 days.

This patent is subject to a terminal disclaimer.

(21) Appl. No.: 17/712,743

(22) Filed: Apr. 4, 2022

(65) Prior Publication Data
US 2022/0311695 A1 Sep. 29, 2022

Related U.S. Application Data

(63) Continuation of application No. 17/214,852, filed on Mar. 27, 2021, now Pat. No. 11,310,146.

(51) Int. Cl.
*G06F 15/173* (2006.01)
*H04L 45/02* (2022.01)
*H04L 9/40* (2022.01)
*H04L 45/00* (2022.01)

(52) U.S. Cl.
CPC .............. *H04L 45/02* (2013.01); *H04L 45/34* (2013.01); *H04L 63/0272* (2013.01); *H04L 63/0428* (2013.01)

(58) Field of Classification Search
CPC ..... H04L 45/02; H04L 45/34; H04L 63/0272; H04L 63/0428

USPC ......................................................... 709/238
See application file for complete search history.

(56) References Cited

U.S. PATENT DOCUMENTS

| 8,149,722 | B2 * | 4/2012 | Mera ................... H04L 12/4633 370/254 |
| 8,442,030 | B2 | 5/2013 | Dennison |
| 8,750,288 | B2 | 6/2014 | Nakil et al. |
| 9,094,285 | B2 | 7/2015 | Gorkemli et al. |
| 9,319,300 | B2 | 4/2016 | Huynh Van et al. |
| 9,722,935 | B2 | 8/2017 | Bouanen et al. |
| 9,900,250 | B2 | 2/2018 | Dong et al. |
| 9,912,614 | B2 | 3/2018 | Koganti |

(Continued)

OTHER PUBLICATIONS

Virtual eXetensible Local Area Network (VXLAN): A Framework for Overlaying Virtualized Layer 2 Networks over Layer 3 Networks, M. Mahalingam Storvisor et al., <https://www.rfc-editor.org/rfc/rfc7348.html>, Aug. 2014, 22 pages.

(Continued)

*Primary Examiner* — Anthony Mejia
(74) *Attorney, Agent, or Firm* — Young Basile Hanlon & MacFarlane, P.C.

(57) ABSTRACT

A method and system for a VPN setup in which one of the peers' outgoing traffic is dynamically rerouted to exit VPN servers based on infrastructure or user requirements without losing the initial connection state or leaking unencrypted network traffic is described. One exemplary embodiment describes a method for a client to change their routing to multiple server locations. Another exemplary embodiment describes a method for the entry VPN servers to reroute traffic based on strategic traffic analysis.

20 Claims, 16 Drawing Sheets

(56) References Cited

U.S. PATENT DOCUMENTS

| | | |
|---|---|---|
| 10,097,372 B2 | 10/2018 | Bhattacharya et al. |
| 10,148,506 B1 | 12/2018 | Anburose et al. |
| 10,200,274 B1 | 2/2019 | Suryanarayana et al. |
| 10,326,532 B2 | 6/2019 | Ashrafi |
| 10,361,972 B2 | 7/2019 | Biruduraju |
| 10,374,953 B1* | 8/2019 | Branch ................. H04L 45/745 |
| 10,705,808 B2 | 7/2020 | Chiosi et al. |
| 10,749,796 B2 | 8/2020 | Dowlatkhah et al. |
| 10,757,576 B2 | 8/2020 | Ashrafi |
| 10,819,629 B2 | 10/2020 | Dowlatkhah et al. |
| 10,972,386 B2 | 4/2021 | Mackie et al. |
| 10,999,197 B2 | 5/2021 | Hooda et al. |
| 11,134,010 B2 | 9/2021 | Mehmedagic et al. |
| 2007/0033646 A1* | 2/2007 | Tosey ................. H04L 67/14 726/15 |
| 2009/0144817 A1* | 6/2009 | Kumar ............... H04L 63/0272 726/15 |
| 2014/0096183 A1* | 4/2014 | Jain .................... H04L 12/4633 726/1 |
| 2016/0234039 A1* | 8/2016 | Ng ....................... H04L 45/245 |
| 2016/0269353 A1* | 9/2016 | Chan .................. H04L 12/6418 |
| 2016/0286001 A1* | 9/2016 | Chan ..................... H04L 12/66 |
| 2017/0012937 A1* | 1/2017 | Dinha ................. H04L 61/2592 |
| 2017/0171156 A1* | 6/2017 | Schultz ................. H04L 9/3215 |
| 2017/0317919 A1 | 11/2017 | Fernando et al. |
| 2017/0359311 A1* | 12/2017 | Chen ................... H04L 63/0823 |
| 2018/0302321 A1 | 10/2018 | Manthiramoorthy et al. |
| 2019/0173839 A1* | 6/2019 | Lapidous ............ H04L 12/4641 |
| 2019/0230039 A1* | 7/2019 | Wang .................... H04L 49/354 |
| 2019/0280964 A1 | 9/2019 | Michael et al. |
| 2020/0099659 A1 | 3/2020 | Cometto et al. |
| 2020/0336409 A1* | 10/2020 | Branch ................. H04L 45/124 |
| 2020/0403970 A1 | 12/2020 | Chastain et al. |
| 2021/0111998 A1 | 4/2021 | Saavedra |
| 2021/0399920 A1 | 12/2021 | Sundararajan et al. |
| 2022/0311822 A1* | 9/2022 | Nord ..................... H04L 67/306 |

OTHER PUBLICATIONS

Wikipedia, Software-defined networking, https://en.wikipedia.org/wiki/Software-defined_networking, Apr. 10, 2023, 15 pages.

RFC 4271: A Border Gateway Protocol 4 (BGP-4), Y. Rekhter, et al, https://www.rfc-editor.org/rfc/rfc4271, Jan. 2006, 104 pages.

Wikipedia, OSI model, <https://en.wikipedia.org/wiki/OSI_model>, Apr. 10, 2023, 8 pages.

* cited by examiner

SYSTEM AND METHOD FOR OPTIMAL MULTISERVER VPN ROUTING

CROSS-REFERENCE TO RELATED APPLICATION(S)

This application claims priority to and the benefit of U.S. patent application Ser. No. 17/214,852, filed Mar. 27, 2021, the entire disclosure of which is hereby incorporated by reference.

TECHNICAL FIELD

The disclosure belongs to the area of network routing and virtual private network (VPN) technology. More specifically, the disclosures present an efficient way to implement optimal multiserver routing strategies through user preference or traffic analysis.

BACKGROUND

VPN stands for Virtual Private Network (VPN), a technology that allows a network entity to connect to a private network over a public network. Traditionally the main function of VPN has been to allow for a roaming client, or a distant office connected to a public network, to connect to a private network for accessing the resources within e.g. business applications within a corporate LAN.

VPN technology was developed to allow remote users and branch offices to access corporate applications and resources. To ensure security, the private network connection is established using an encrypted layered tunneling protocol and VPN users use authentication methods, including passwords or certificates, to gain access to the VPN. In other applications, Internet users may secure their connections with a VPN, to circumvent geo-restrictions and censorship, or to connect to proxy servers to protect personal identity and location to stay anonymous on the Internet.

VPN customers generally use TCP for connection to resources on the Internet while connected to the VPN service provider. As a standard during the connection, a single end-to-end TCP link is established over the VPN tunnel from the VPN customer to the target resource on the Internet. The endpoints of this TCP connection negotiate, or inform each other of, the set of network capability thresholds available to them, through the use of optional parameters defined within the packets. When communicated during the established connection, these parameters will drive the functionality of the protocol, helping effectively manage the bandwidth available, and mitigate any negative factors interfering with the flow of data e.g. latency, congestion and packet loss.

VPNs are classified on the basis of topology and protocols. In networking terms, a topology refers to the arrangements of the elements of a communication network. There are three topologies of VPNs, Peer-to-Peer VPN, Client-to-Server VPN and Site-to-Site VPN. Basically, Peer to Peer VPN sets up a secure tunnel between two computers via public networks. An IP address will be assigned to each end of the tunnel so that the two computers can communicate with each other as if they are connected by a physical Ethernet cable. The limitation of Peer to Peer VPN is that the VPN tunnel can be shared by only two computers.

Client to Server VPN sets up a secure tunnel between a VPN client and a specific network via public networks. The VPN client can connect to all the computers inside the specific network. However, unlike peer to peer VPN, Client to Server VPN only encrypts the traffic between VPN Client and VPN server, and the traffic between VPN server and other computers in the specific network is not encrypted.

Site to Site VPN sets up a secure tunnel between two networks via the Internet where the tunnel endpoints are a VPN concentrator and a VPN server. Here, a VPN concentrator refers to a networking device that allows multiple VPN tunnels to use a single network. VPN concentrators are designed specifically for managing VPN communications infrastructures in secure multi-user environments. Site-to-Site VPNs encrypt the traffic between VPN concentrators and VPN servers, and any traffic outside the tunnel endpoints is not encrypted. Site to Site VPN is widely used between a company's main office and remote office.

The VPN client application is the software installed on the user device, which is responsible for establishing a connection between the user device and the VPN server and offers access to VPN services. Most common operating system platforms these days provide pre-installed VPN client application software; however, third-party VPN client applications are more popular and can offer better user interface and features.

VPNs employ multiple protocols to successfully establish an encrypted tunnel. The choice of a VPN protocol depends on the type of traffic to be sent via the tunnel. VPN protocols can be Layer 2 protocols and Layer 3 protocols.

A Layer 2 VPN protocol encapsulates packets on the OSI Layer 2 i.e., the Data link layer. Here, the OSI refers to the Open Systems Interconnection model which is a seven-layer model that computer systems use to communicate over a network. Examples of Layer 2 VPN protocols are Layer 2 MPLS VPN, OpenVPN, PPTP and L2TP.

A Layer 3 VPN protocol encapsulates packets on the OSI Layer 3 that is the Network layer. Examples of Layer 3 VPN protocols are Layer 3 MPLS VPN, IPsec and OpenVPN. Finally, the Transport Layer Security (TLS) and its predecessor Secure Sockets Layer (SSL) are Layer 4 VPN protocols that encrypt segments of network connections at the OSI Layer 4 (transport layer).

OpenVPN is an open source protocol that works by encapsulating Layer 2 and Layer 3 packets inside UDP or TCP packets and sending them to the destination. OpenVPN uses pre-shared, certificate-based, and username/password-based keys for authentication. Moreover, OpenVPN is capable of establishing direct links between computers across network address translators (NATs) and firewalls.

To summarize, a regular VPN connection routes both outgoing and incoming traffic through a single VPN server acting as an intermediary. In some instances, the VPN server to which a user connects will relay the user's requests through proxy servers. Proxy servers can perform several functions to increase data security and network performance, including acting as a firewall and web filter, providing shared network connections, and cache data to speed up common requests. Proxy servers can supplement the privacy of the VPN user. Similar to a standard VPN server a proxy server can be used to change the IP address and other identifying information the web request contains.

Proxies can be used to bypass Internet restrictions (e.g. firewalls) by enabling a user to request content through a (remote) proxy server instead of accessing the content directly. Proxy servers are often used to get around geo-IP based content restrictions. If someone wants to get content from a United States (US) webpage that they are not allowed to access from their home country, the request can go through a proxy server that is located in the US, thus operating from a US IP address space. Using proxy services, the user's traffic seems to be coming from the US IP address.

A proxy server (a computer system or an application) connection by a client acts as an intermediary for requests from clients seeking resources from other servers. A client connects to the proxy server, requesting some service, such as a file, a connection, a web page, or other resources available from a different server. The proxy server evaluates the request for content and forwards the request to the actual target system or systems containing the corresponding content. After obtaining the content, the proxy server normally forwards the content to the original requestor, but other actions can also be performed by the proxy (e.g., return error message, etc.). Depending on the type of request, a proxy server may or may not have full visibility into the actual content fetched to the original requestor, e.g. in case of an encrypted Hypertext Transfer Protocol Secure (HTTPS) session, the proxy may serve as an intermediary, blindly forwarding the data without being aware of what is being forwarded.

The term routing in general sense refers to a process of selecting a path for traffic in a network or between or across multiple networks. Static routing occurs when a network interface uses a manually configured routing entry, rather than information from dynamic routing traffic. In many cases, static routes are manually configured by a network administrator by adding entries into a routing table. In dynamic routing, the network administrator configures a routing protocol on the network interfaces. The routing protocol learns about other network interfaces, and exchanges routes automatically. When new network interfaces are added or removed, the dynamic routing protocols are capable of updating the routing information.

Dynamic routing protocols are useful in determining an optimal routing path. Additionally, dynamic routing protocols can determine the next-best path if the optimal path becomes unusable. The capability to compensate for topology changes is the most important advantage of dynamic routing when compared with static routing.

Dynamic routing protocols are developed based on an algorithm. Generally, an algorithm is a step-by-step procedure for solving a problem. A dynamic routing protocol in a general sense will specify a procedure for passing reachability information about networks to other interfaces and procedures for receiving reachability information from other network interfaces. A dynamic routing protocol will provide a procedure for determining optimal routes based on the aforementioned reachability information and for recording the reachability information in a routing table. Finally, a dynamic routing protocol will provide a procedure for reacting to topology changes in a network.

When there are multiple routes in a network to the same destination, dynamic routing protocol can provide a mechanism for calculating the best path. A metric is a variable assigned to routes as a means of ranking them from best to worst or from most preferred to least preferred. Different dynamic routing protocols can use multiple metrics.

Hop count is one of such metrics that refers to the number of intermediate interfaces through which data must pass between source and destination. Load is another metric that reflects the amount of traffic utilizing the links along the path. The best path is the one with the lowest load. Delay is a measure of the time a packet takes to traverse a route. Dynamic routing protocol utilizes delay as a metric which would choose the path with the least delay as the best path. However there may be many ways to measure delay.

Reliability is a metric that measures the likelihood that the link will fail in some way and can be either variable or fixed. Examples of variable-reliability metrics are the number of times a link has failed or the number of errors it has received within a certain time period. Fixed-reliability metrics are based on known qualities of a link as determined by the network administrator. The path with highest reliability would be selected as best.

Examples of dynamic routing protocols are Routing Information Protocol (RIP), Enhanced Interior Gateway Routing Protocol (EIGRP) and Open Shortest Path First (OSPF). These dynamic routing protocols aid in determining the next-hop or in other words the next link to be used in routing the packet closer to the destination. Here, the term hop refers to the trip a data packet takes from one network interface to another in a network. The hop count refers to the number of intermediate interfaces through which data must pass between source and destination. If the network coverage area is significantly large and includes multiple network interfaces, then the network traffic has to traverse through multiple network interfaces in order to reach the destination. It means that a network interface can use other network interfaces as relays to reach a destination. Such type of routing is known as the multi-hop routing.

The chief advantages of dynamic routing over static routing are scalability and adaptability. A dynamically routed network can grow more quickly and larger and is able to adapt to changes in the network topology brought about by this growth or by the failure of one or more network components. Moreover, the dynamic routing protocol can reroute traffic around a link that is down or congested. This feature of the dynamic routing can ensure optimal uptime for users. Because the routing protocol has intelligence and can react faster, the users may experience more uptime. As the network grows, the need for the network administrator to configure all network interfaces and links can be eliminated. Instead, the administrator can configure the dynamic routing protocol on the new network interface to communicate to other existing interfaces about the new routing options or paths that the new interface could provide.

Most VPN service providers emphasize security and privacy as their primary focus as a service provider. However, certain issues occur in a VPN service such as constant buffering of videos during a streaming session, slow download speed, abrupt loss of connectivity or even inability to load specific web pages. The frequent occurrence of the aforementioned issues can be a significant challenge for any VPN service provider from a business point of view as well as for a user alike. The two main components of a VPN connection speed are the network throughput and latency. Throughput is the amount of data that can be transferred in a specific amount of time. In contrast, latency is the amount of time between sending a request and receiving a response from a server. Therefore, there is a need for VPN service providers to continually develop strategies to address both of the aforesaid issues in order to maintain optimal service.

Aligning service with the user's intent has become an issue for VPN service providers. For instance, VPN service providers can discern the nature of a user requests (e.g. whether it is a streaming request as opposed to executing a remote application) and route the specific request to the most suitable server available based on server location, performance history, bandwidth limitations and request processing functionality, etc. Additionally, the VPN service provider can desire to set strategies on the fly to identify the best route available to the target server. As a result, an improved VPN service can be beneficial for both VPN service providers and users alike.

Moreover, ensuring the user-specific strategies can avoid unnecessary interruption or downtime in a connection (e.g.

buffering in a streaming session). Dynamic routing and multi-hop routing techniques could be integrated into a VPN service in order to develop the user-specific strategies. Along with user-specific services, additional anonymity can be valuable from the user's point of view. Methods could be developed to cascade the IP address of the VPN server through routing across multiple servers, creating complete anonymity.

SUMMARY

Embodiments disclosed herein provides methods and systems to reroute the outgoing traffic dynamically through different VPN servers based on specific criteria or strategies without losing the user's session or exposing the customer's unencrypted network traffic.

One of the embodiments enables a VPN user to determine a customized routing policy in order to direct the customer's traffic to an alternative secondary VPN server based on user-specific criteria. Another embodiment facilitates the primary VPN server to reroute the user's traffic to multiple secondary VPN servers based on specific strategies. The rerouting of the user's traffic through various secondary VPN servers can improve network throughput and anonymity of the VPN user.

In another embodiment, the routing strategies of the primary VPN server aim to reroute a particular type of TCP traffic. In that case, the primary VPN server splits the TCP traffic into a multitude custom-routed streams, sending part of the packets along one route and the other part of the traffic along the alternative route, which may constitute sending the traffic of a single VPN user to two different secondary VPN servers simultaneously.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
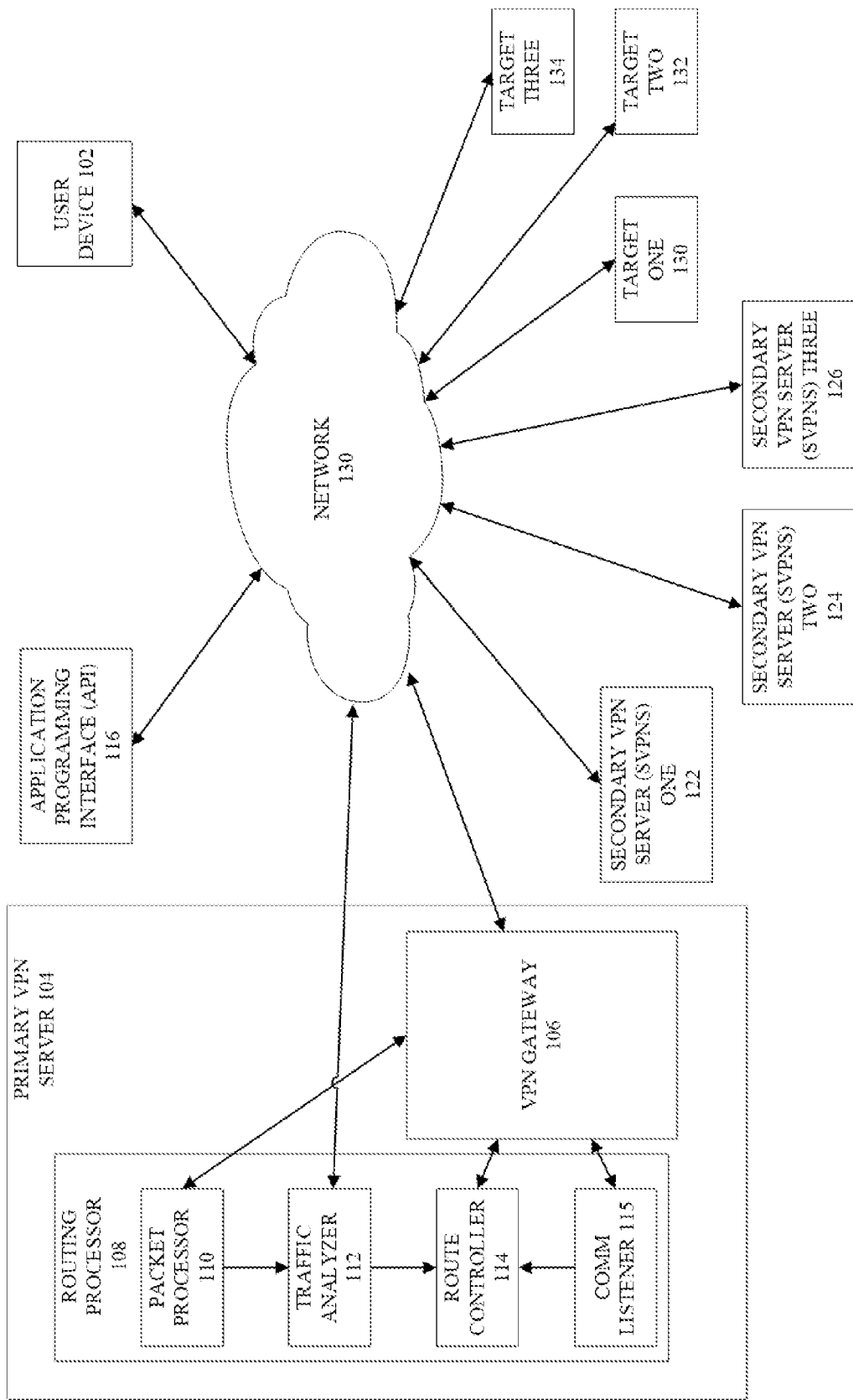
FIG. 1 shows a block diagram of an exemplary architectural depiction of components.

Some general terminology descriptions may be helpful and are included herein for convenience and are intended to be interpreted in the broadest possible interpretation. Elements that are not imperatively defined in the description should have the meaning as would be understood by the person skilled in the art.

User Device 102—a user device can be any suitable user computing device including, but not limited to, a smartphone, a tablet computing device, a personal computing device, a laptop computing device, a gaming device, a vehicle infotainment device, a smart appliance (e.g., smart refrigerator or smart television), a cloud server, a mainframe, a notebook, a desktop, a workstation, a mobile device, or any other electronic device used for connecting to Primary VPN Server 104. A VPN application installed and executed within the user device initiates and establishes the encrypted VPN connection to a VPN server.

Primary VPN Server (PVPNS) 104—a computing device attached to a computer network that accepts VPN users' requests for establishing encrypted connection, or tunnel, and is the endpoint of such encrypted connections from multiple VPN users.

Service Gateway 106—a computing device and a constituent of Primary VPN Server 104. It accepts User Device 102 requests for establishing encrypted connection, or tunnel, and is the endpoint of such encrypted connections from multiple User Devices 102. As a standard with VPN tunneling protocol endpoints, on establishing a VPN connection, or tunnel, with User Device 102, Service Gateway 106 becomes the default gateway for User Device 102.

Routing Processor 108—a logical unit and a constituent of Primary VPN Server 104 that is configured to perform complex operations of identifying the optimal secondary VPN servers from a plurality of VPN Servers. Routing Processor 108 is capable of querying API 116 for routing strategies and available servers.

Packet Processor 110—processing unit within Routing Processor 108 that processes or aggregates user traffic for further analysis.

Traffic Analyzer 112—processing unit within Routing Processor 108 that analyzes user traffic and matches it with existing routing strategies.

Route Controller 114—processing unit within Routing Processor 108 that sets and implements routing strategies suggested by Traffic Analyzer 112 or transmitted from Comm Listener 115.

Comm Listener 115—processing unit within Routing Processor 108 that is preset to receive routing preferences from User Device 102.

API 116—VPN service provider infrastructure component providing a collection of service endpoints exposing the functionality necessary for VPN customers to authenticate against VPN Service Provider, as well as to obtain the prerequisites necessary for establishing the encrypted connection to a VPN server. API also acts as a centralized hub for routing strategies and server information that is accessible to Primary and Secondary VPN Servers as well as VPN Application present in User Device 102.

Secondary VPN Server One (SVPNS One) 122—a first instance of a computing device attached to a computer network that relays VPN users' requests for establishing encrypted connection, or tunnel, and is the last endpoint of such encrypted connection that connects to a target.

Secondary VPN Server Two (SVPNS Two) 124—a second instance of a computing device attached to a computer network that relays VPN users' requests for establishing encrypted connection, or tunnel, and is the last endpoint of such encrypted connection that connects to a target.

Secondary VPN Server Two (SVPNS Three) 126—a second instance of a computing device attached to a computer network that relays VPN users' requests for establishing encrypted connection, or tunnel, and is the last endpoint of such encrypted connection that connects to a target.

Target One 130—a first instance of a server serving any kind of content accessible over multiple protocols over the Internet. Most often a device placed within a datacenter network of high reliability and capability. However, it can constitute any endpoint on the network, for example, another consumer device, router or other network connected device.

Target Two 132—a second instance of a server serving any kind of content accessible over multiple protocols over the Internet. Most often a device placed within a datacenter network of high reliability and capability. However, it can constitute any endpoint on the network, for example, another consumer device, router or other network connected device.

Target Three 134—a third instance of a server serving any kind of content accessible over multiple protocols over the Internet. Most often a device placed within a datacenter network of high reliability and capability. However, it can constitute any endpoint on the network, for example, another consumer device, router or other network connected device.

Network 120—a digital telecommunications network that allows network-attached nodes to communicate as well as share and consume resources. Examples of a network are local-area networks (LANs), wide-area networks (WANs), campus-area networks (CANs), metropolitan-area networks (MANs), home-area networks (HANs), Intranet, Extranet, Internetwork, Internet.

First, second, third traffic—is a simple denomination of a sequence of data packets in time. The traffic in a VPN session is not divided into sequential parts. However, one can distinguish traffic that comes before or after a different traffic. These domination simply indicated that some traffic has reached an endpoint or was sent by an endpoint before or after some other traffic.

Configuration strategy—is a set of parameters that indicate a particular behaviour pattern of User Device 102 that suggest an optimal routing trough an exit VPN server. For example, a configuration strategy can indicate that User Device 102 accesses pages from a certain location and can identify an exit VPN server close to it. Configuration strategies can be centralized across entry VPN servers so that they all use the same and updated configuration strategies. A single configuration strategy can consist of the times and intervals at which specific content (websites or services in a specific language or location) are accessed or types of services (HTTP traffic, gaming, gambling, streaming services and others) requested to indicate an optimal exit VPN server. The location of targets can be identified through their IP address. Types of activities can be identified through ports that are being used for network communication. Other criteria can be added or subtracted from the current embodiments without changing the method overall.

The present embodiments now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

FIG. 1 shows an exemplary overall architecture of the current embodiment that comprises of User Device 102, which can be any computing or a networking device (e.g., a personal computer, mobile phone, a tablet computer, router, smart home device) having access (e.g. Internet connection) to a particular network, a Primary VPN Server 104, API 116, a Secondary VPN Server One 122, and Target One 126. Different embodiments can have additional components, required for additional actions, for example, there might be two secondary VPN servers employed in the cases in which a connection is split over two exit servers. The split traffic can be directed at two different target servers, therefore the targets would be represented by two or more instances of target servers. Likewise, more than one and usually more than 100 or more than 1000 or 10000 user devices can be connected to a primary server simultaneously. There are internal components contained in all elements but the description of them has been forgone for clarity since they are not relevant to current embodiments. However, it must be noted that at least some software and hardware components are prerequisites for a VPN connection to function, for example a VPN client application must be present in User Device 102 to access API 116 and Primary VPN Server 104.

All the mentioned components of the embodiments have access to the Network 120 and are able to interact with each other through it. Here, Network 120 can be any digital telecommunication network that permits several nodes to share and access resources, e.g. local-area network (LAN), wide-area networks (WANs), campus-area networks (CANs), metropolitan-area networks (MANs), home-area networks (HANs), Intranet, Extranet, Internetwork, Internet.

Primary VPN Server 104 contains the following sub-elements: Service Gateway 106 and Routing Processor 108. Routing Processor 108 also contains the following exemplary sub-elements: Packet Processor 110, Traffic Analyzer 112, Route Controller 114, Comm Listener 115. Service Gateway 106 has direct access to Network 120 and is able to communicate with external components, like User Device 102, Secondary VPN Server One 122, and API 116. In addition, Traffic Analyzer 112 within Routing Processor 108 also has access to Network 120 and in the current embodiments is able to communicate with API 116 directly. In some embodiments, the communication can be relayed over Service Gateway 106 instead of being direct but this does not change the overall functioning of the embodiments.

While the elements shown in the FIG. 1 implement the exemplary embodiment, some elements in other embodiments can have different titles or can be combined into a single element instead of two separate elements (for example, Traffic Analyzer 112 and Route Controller 114 can be combined into a single hardware, software infrastructure to form a single logical unit or can also be combined into a single logical unit on a cloud. Likewise, Service Gateway 106 and Routing Processor 108 can also be combined into a single software infrastructure that is run on single or shared hardware or can be combined to a single unit on a cloud). However, the functionality of elements and the flow of information between the elements is not impacted generally by such combinations or consolidations. Therefore, FIG. 1 as shown should be interpreted as exemplary only, and not restrictive or exclusionary of other features, including features discussed in other areas of this disclosure here within. The infrastructure shown here is represented as to reveal the logical structure and technological action flow of the embodiments.

In FIG. 1 all occurrences of communication between the various components of the current embodiment takes place through Network 120. The instances of communication between User Device 102 and the Primary VPN Server 104 can happen through an encrypted tunneling protocol provided by Service Gateway 106 which can include the process of authentication and authorization to enable data exchange between User Device 102 and Primary VPN Server 104. Likewise, the instances of communication between the Primary VPN Server 104 and Secondary VPN Server One 122 can be over proxy protocol or any of the following protocol defined above, IP in IP (Protocol 4): IP in IPv4/IPv6; SIT/IPv6 (Protocol 41): IPv6 in IPv4/IPv6; GRE (Protocol 47): Generic Routing Encapsulation; OpenVPN (UDP port 1194); SSTP (TCP port 443): Secure Socket Tunneling Protocol; IPSec (Protocol 50 and 51): Internet Protocol Security; L2TP (Protocol 115): Layer 2 Tunneling Protocol; VXLAN (UDP port 4789): Virtual Extensible Local Area Network; WireGuard; or Quic.

A current state of the art information flow would generally consist of User Device 102 receiving authentication and server information from API 116 over Network 120 and initiating a connection to Primary VPN Server 104, Service Gateway 106 providing point to point contact with User Device 102 and establishing a secure connection with it. VPN connectivity is established by an encrypted tunneling protocol. All requests from User Device 102 are sent through this encrypted tunnel where the request packets are encoded and secure. This encoding of packets is known as the encapsulation and enables data packets to appear as though they are of a public nature to a public network but in fact they are actually private data packets, making them to pass unnoticed. During the establishment of this point to point tunneling connection, Service Gateway 106 assigns a private IP address to User Device 102 that is entirely different form the original IP address. All requests originating from User Device 102 have this new private IP address assigned to it. The private IP address is exclusive to the individual user device within the VPN server but it is not globally unique—other users on other servers might have the same private IP address. However, since the private IP address is only used for communications between a particular Primary VPN Server 104 and User Device 102, there is no ambiguity. Once User Device 102 establishes a secure connection with Primary VPN Server 104, all requests originating from User Device 102 are sent through the Primary VPN Server 104 on behalf of User Device 102.

The following detailed description of figures will show how the embodiments disclosed herein improve upon the state of the art functionality. The main focus of the improvements is to find an optimal routing track for the whole or a part of user traffic.

Figure 2A:
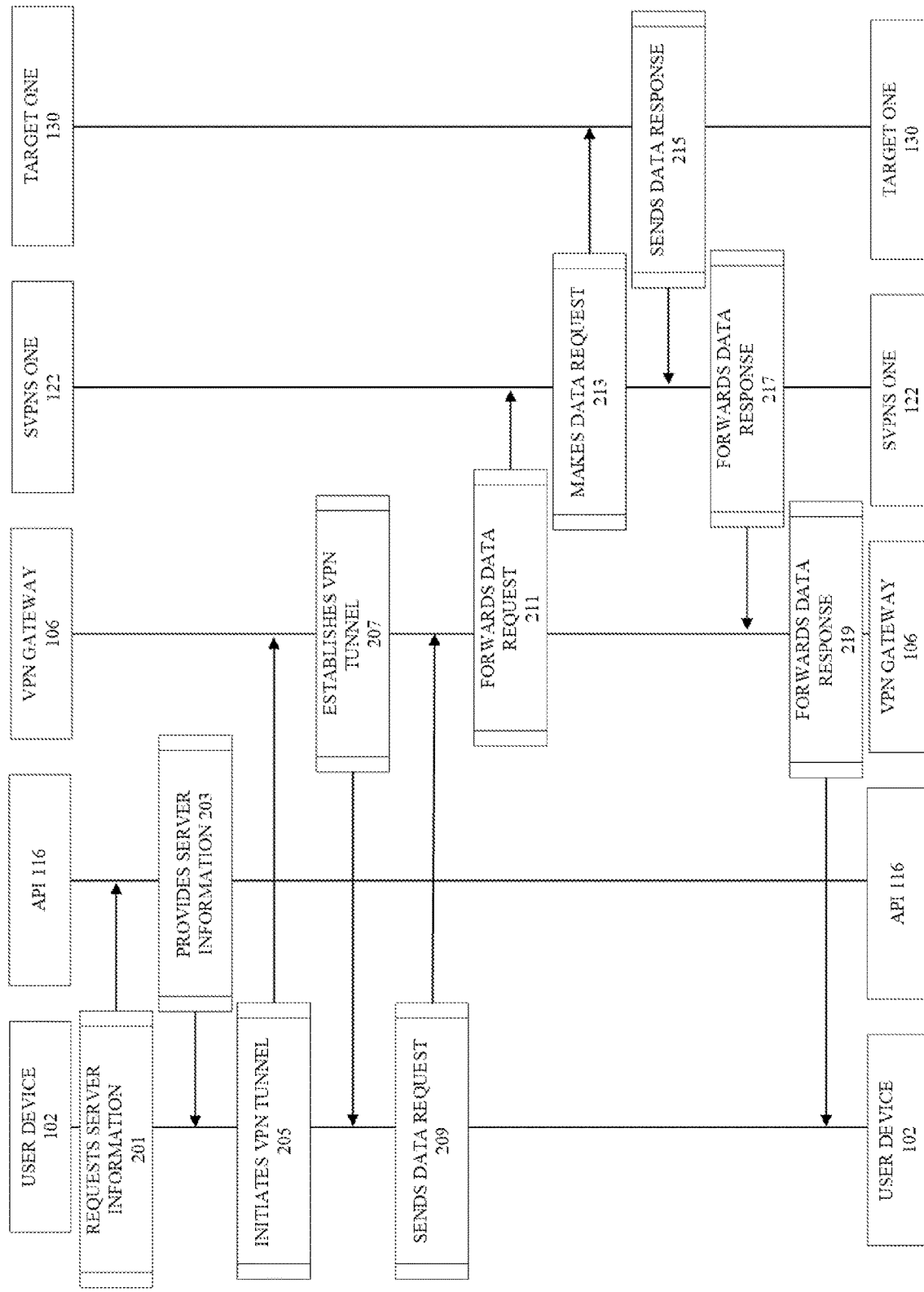
FIG. 2A shows an exemplary flow diagram of user defined multiserver routing.

FIG. 2A shows an exemplary flow diagram of user defined multiserver routing. In step 201, User Device 102 initiates a process to authenticate with the API 116. User Device 102 can be authenticated using a variety of methods consisting of providing a username and a password or other identifying information.

In step 203, API 116 confirms the identity of User Device 102 and authenticates it. API 116 also provides a list of VPN servers available for connection at that time. One of those servers available to User Device 102 is PVPNS 104.

In step 205, User Device 102 initiates a VPN connection with PVPNS 104 and more specifically by addressing VPN Gateway 106. This action on User Device 102 can happen through a software application installed on User Device 102 that has a dashboard or other user interface. However, User Device 102 can engage in a VPN connection with the VPN Gateway 106 by configuring their system network settings more directly.

In step 207, once VPN Gateway 106 receives the request to connect, it creates a VPN tunnel between itself and User Device 102. The tunnel is established by VPN Gateway 106 receiving User Device 102 requests from its public IP address, then returning a response with a newly assigned private IP address and a private IP address of the VPN Gateway 106 through which User Device 102 can communicate with VPN Gateway 106 in a private way. All the subsequent communication is done through the tunnel created by User Device 102 and VPN Gateway 106. The connection is private (secure) because symmetric cryptography is used to encrypt the data transmitted. Usually, the keys for this symmetric encryption are generated uniquely for each connection and are based on a shared secret that was negotiated at the start of the session. The server and client negotiate the details of which encryption algorithm and cryptographic keys to use before the first byte of data is transmitted. The negotiation of a shared secret is both secure (the negotiated secret is unavailable to eavesdroppers and cannot be obtained, even by an attacker who places themselves in the middle of the connection) and reliable (no attacker can modify the communications during the negotiation without being detected).

The identity of the communicating parties can be authenticated using public-key cryptography. This authentication can be optional but is generally required for at least one of the parties (typically the server). The connection is reliable because each message transmitted includes a message integrity check using a message authentication code to prevent undetected loss or alteration of the data during transmission.

In step 209, after the VPN tunnel is established and secured, User Device 102 is able to make requests and access the target servers privately without its public IP being revealed. User's individual traffic consists of sending requests and receiving responses as well as other protocol-specific information exchange, like TCP handshakes, cryptographic key exchange, and others. Since the primary VPN server does not analyze the user's traffic to the detail of individual requests, it deals with traffic more generally, i.e. the flow of information from and to its user. However, for the sake of clarity we will use requests and responses as discrete entities to illustrate the flow of actions. However, actions by the primary VPN server are not limited to these individual datagrams. These actions are also not limited by a particular protocol. For example, the traffic can consist of TCP or UDP packets and datagrams. User Device 102 makes a request to access a domain Target One 130 (for example, a web page, a video streaming service, a gaming or gambling platform) and sends it to VPN Gateway 106.

In step 211, VPN Gateway 106 receives the data request from User Device 102 and selects a default routing to an exit VPN server that will ultimately make a request to Target One 130. The choice by default is made upon some preset rules or rules updated manually at PVPNS 104. The choice can also be made by considering several factors, for example server proximity to Target One 120 or User Device 102 but this does not change the overall functionality of the embodiments. In this case, VPN Gateway 106 can choose SVPNS One 122 as the exit VPN server and forward the request from User Device 102 to SVPNS One 122.

The internal communication between entities of the VPN service provider infrastructure can be exchanged in a variety of ways and protocols, including but not limited to IP in IP (Protocol 4): IP in IPv4/IPv6; SIT/IPv6 (Protocol 41): IPv6 in IPv4/IPv6; GRE (Protocol 47): Generic Routing Encapsulation; OpenVPN (UDP port 1194); SSTP (TCP port 443): Secure Socket Tunneling Protocol; IPSec (Protocol 50 and 51): Internet Protocol Security; L2TP (Protocol 115): Layer 2 Tunneling Protocol; VXLAN (UDP port 4789): Virtual Extensible Local Area Network; WireGuard; Quic. However, it is desirable that the communication takes place over an encrypted protocol, like a VPN tunnel, so that the data exchanged is encrypted and cannot be intercepted.

In step 213, SVPNS One 122 makes a request to Target One 130 for the data specified in the original request from User Device 102. The type of data can be an HTTP response, a streaming service or any other media or data entity. The applications of the current embodiments are not limited by a particular protocol or the type of target that is being accessed. The applications of the current embodiments are not limited by a particular protocol or the type of target that is being accessed.

In step 215, Target One 130 returns the data specified in the original request from User Device 102 to SVPNS One 122.

In step 217, SVPNS One 122 forwards the data received from Target One 130 to VPN Gateway 106.

In step 219, VPN Gateway 106 returns the request data to User Device 102 over the existing VPN tunnel.

The data exchange described above in steps 209 and 219 forms a complete cycle and can be reiterated multiple times before any changes are made to the existing communication. The rates of the cycle are flexible and can include, for example, one, one hundred, one thousand or ten thousand instances. During the cycle, all elements remain stable and User Device 102 sends all requests to PVPNS 104 and then they are routed via SVPNS One 122.

Figure 2B:
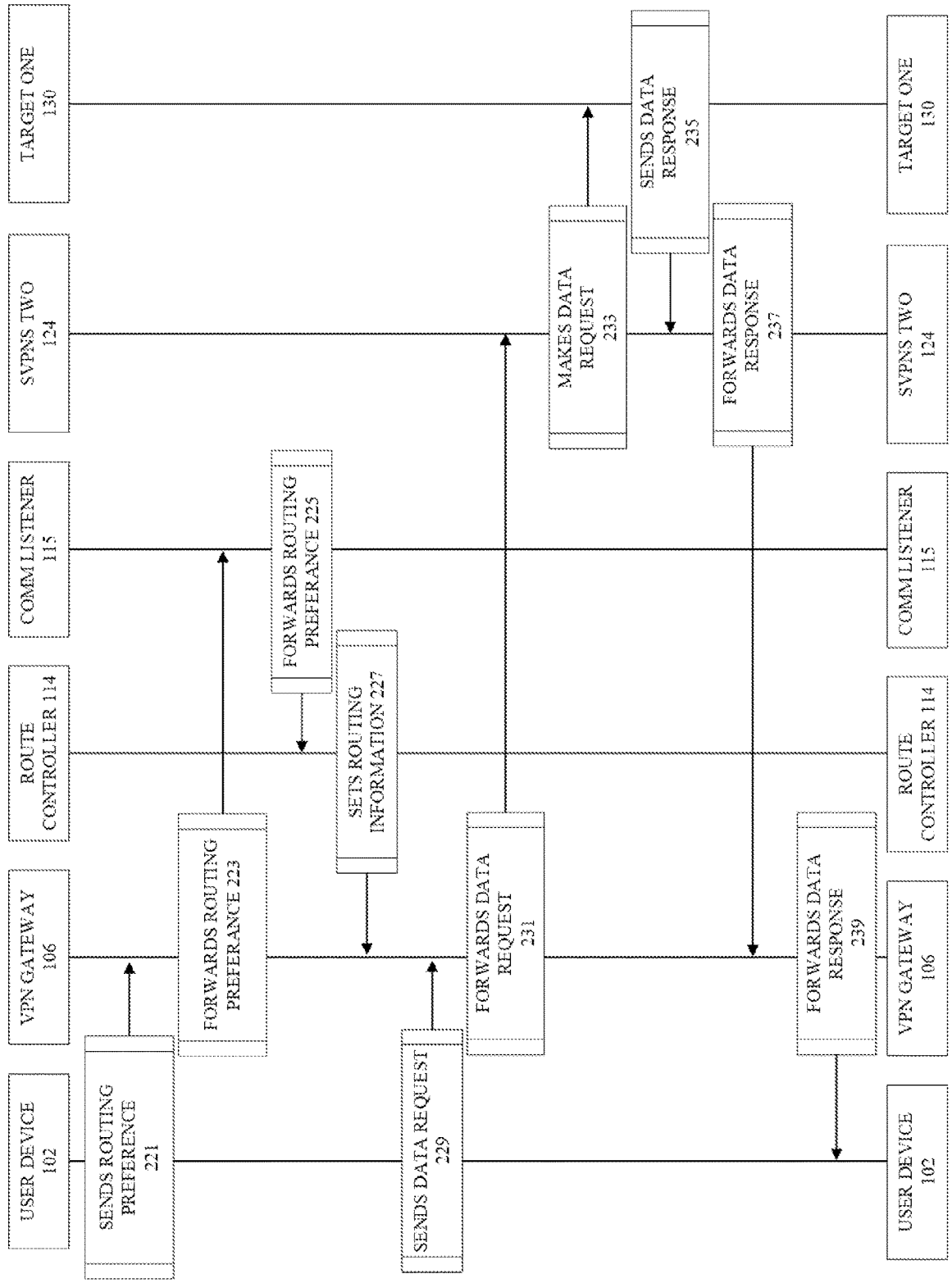
FIG. 2B shows the continuation of the exemplary flow diagram of user defined multiserver routing.

FIG. 2B shows the continuation of an exemplary flow diagram of user defined multiserver routing. In step 221, User Device 102 sends a preference to VPN Gateway 106 that a different exit server should be used. That preference might be a freely formed request from User Device 102 but it can also be made available to User Device 102 via a dashboard or as a list of potential exit VPN servers.

The routing preference request is sent from a user with a destination address that belongs to the VPN service provider infrastructure, and more specifically to Comm Listener 115 which is a listening device or software that has a specific port open to specifically receive such requests from users. Thus, a routing preference request is different from other requests from User Device 102 in that it is addressed no to an external target server but to an element of PVPNS 104. The routing preference request is sent via the original VPN tunnel and thus is firstly addressed to VPN Gateway 106.

In step 223, VPN Gateway 106 receives the routing preference request from User Device 102 and forwards it to Comm Listener 115.

In step 225, Comm Listener 115 receives the routing preference request from User Device 102. It then forwards this request to Route Controller 114.

In step 227, Route Controller 114 receives the routing preference request from User Device 102 and formulates an appropriate routing rule that corresponds to User Device 102 preference. In one embodiment, User Device 102 made a preference to reach Target One 130 not via SVPNS One 122 as defined in the default routing and executed in the previous data exchange cycles in steps 209-219, but via SVPNS Two 124. In other words, User Device 102 expressed a preference to reroute its traffic via SVPNS Two 124. Route Controller 114 identifies this preference and makes a routing rule to that effect that it forwards to VPN Gateway 106.

In one example, the embodiments begin the routing with the first SYN packet received or, in the case of UDP, a stateful NAT can be employed to route traffic.

In step 229, after the routing preference has been implemented at VPN Gateway 106, User Device 102 makes a request to access a domain Target One 130 (the same target as in the previous data exchange cycles) and sends it to VPN Gateway 106.

In step 231, VPN Gateway 106 receives the data request from User Device 102 and selects the preferred routing to an exit VPN server that was selected by User Device 102. In this data exchange cycle, VPN Gateway 106 cannot choose SVPNS One 122 as the exit VPN server and must route the request to SVPNS Two 124. VPN Gateway 106 can employ the underlying functionalities of its operating system to execute intermediate steps necessary to complete the routing. However, this does not alter the overall flow of actions within the embodiments.

The internal communication between entities of the VPN service provider infrastructure can be exchanged in a variety of ways and protocols, including but not limited to IP in IP (Protocol 4): IP in IPv4/IPv6; SIT/IPv6 (Protocol 41): IPv6 in IPv4/IPv6; GRE (Protocol 47): Generic Routing Encapsulation; OpenVPN (UDP port 1194); SSTP (TCP port 443): Secure Socket Tunneling Protocol; IPSec (Protocol 50 and 51): Internet Protocol Security; L2TP (Protocol 115): Layer 2 Tunneling Protocol; VXLAN (UDP port 4789): Virtual Extensible Local Area Network; WireGuard; Quic. However, it is desirable that the communication takes place over an encrypted protocol, like a VPN tunnel, so that the data exchanged is encrypted and cannot be intercepted.

In step 233, SVPNS Two 124 makes a request to Target One 130 for the data specified in the request from User Device 102. The type of data can be an HTTP response, a streaming service or any other media or data entity. The applications of the current embodiments are not limited by a particular protocol or the type of target that is being accessed.

In step 235, Target One 130 returns the data specified in the original request from User Device 102 to SVPNS Two 124.

In step 237, SVPNS Two 124 forwards the data received from Target One 130 to VPN Gateway 106.

In step 239, VPN Gateway 106 returns the request data to User Device 102 over the existing VPN tunnel.

The data exchange described in steps 229 and 239 forms a complete cycle and can be reiterated multiple times before any changes are made to the existing communication. The rates of the cycle are flexible and can include, for example, one, one hundred, one thousand or ten thousand instances.

However, during this cycle, User Device 102 sends all requests to PVPNS 104 and they are routed via SVPNS Two 124. This type of connection constitutes a multiserver VPN connection.

Figure 3:
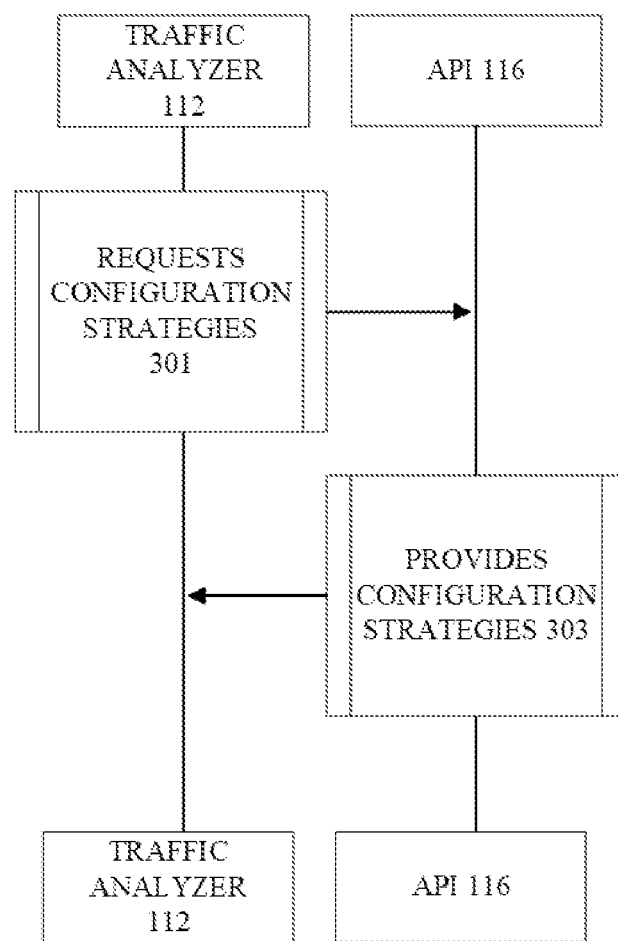
FIG. 3 shows an exemplary flow diagram of routing strategy update and synchronization.

FIG. 3 shows an exemplary flow diagram of routing strategy update and synchronization. The method described here shows an exemplary instance of updating and synchronizing routing information among various VPN servers in the VPN service provider infrastructure. The nature of the said infrastructure is such that any physical or software defined (virtual) server can be a primary (entry) VPN server in some communication instances but a secondary (exit) VPN server in others. These roles can also be taken up at the same time, so the same server can be an entry server for some communications and an exit server for others simultaneously. Optimal routing strategies are also necessary for Traffic Analyzer 112 to correctly match analyzed traffic with an existing strategy. Existing strategies need to be updated and synchronized among servers so that they represent optimal routing paths. Routing paths can change when new servers are added, others are removed or suspended or experience performance or load issues.

In step 301, Traffic Analyzer 112 makes an API call to API 116 requesting routing strategy data to achieve the needed synchronization with the rest of the infrastructure.

In step 303, API 116 responds and provides the needed data to Traffic Analyzer 112.

This exemplary flow of information can happen at preset intervals of time or when triggered by an event or a series of events described in the functioning rules of Traffic Analyzer 112. The particular time when strategies are updated does not change the overall functionality of the embodiments. It can happen before, after or during any of the other action flows described in the remaining diagrams.

This method of updating and synchronizing primary VPN servers with the rest of the VPN service provider infrastructure is only meant as an example of implementation. Without changing the overall functionality of the embodiments, the same goal could be achieved by API 116 initiating the communication with Traffic Analyzer 112 and pushing the routing strategies once they have been updated. Such a flow would skip step 301 and perform step 303 directly. Also, routing strategies could be customized manually by a system administrator by inputting or changing routing strategies present in the primary VPN servers. There can be other methods for updating routing information without involving API 116. Other communication means could also be implemented without changing the overall functionality of the embodiments, for example Traffic Analyzer 112 could communicate with API 116 through VPN Gateway 106 or other similar component on the VPN server. Such implementations do not change the overall structure or method of the embodiments.

Examples of routing strategies can include but are not limited to finding the optimal route to the target server, optimizing network latency for gaming or gambling services, distributing the load of the service provider infrastructure, and others. In some instances, traffic can be rerouted to the closest secondary (exit) VPN server to the target thus reducing latency.

Figure 4A:
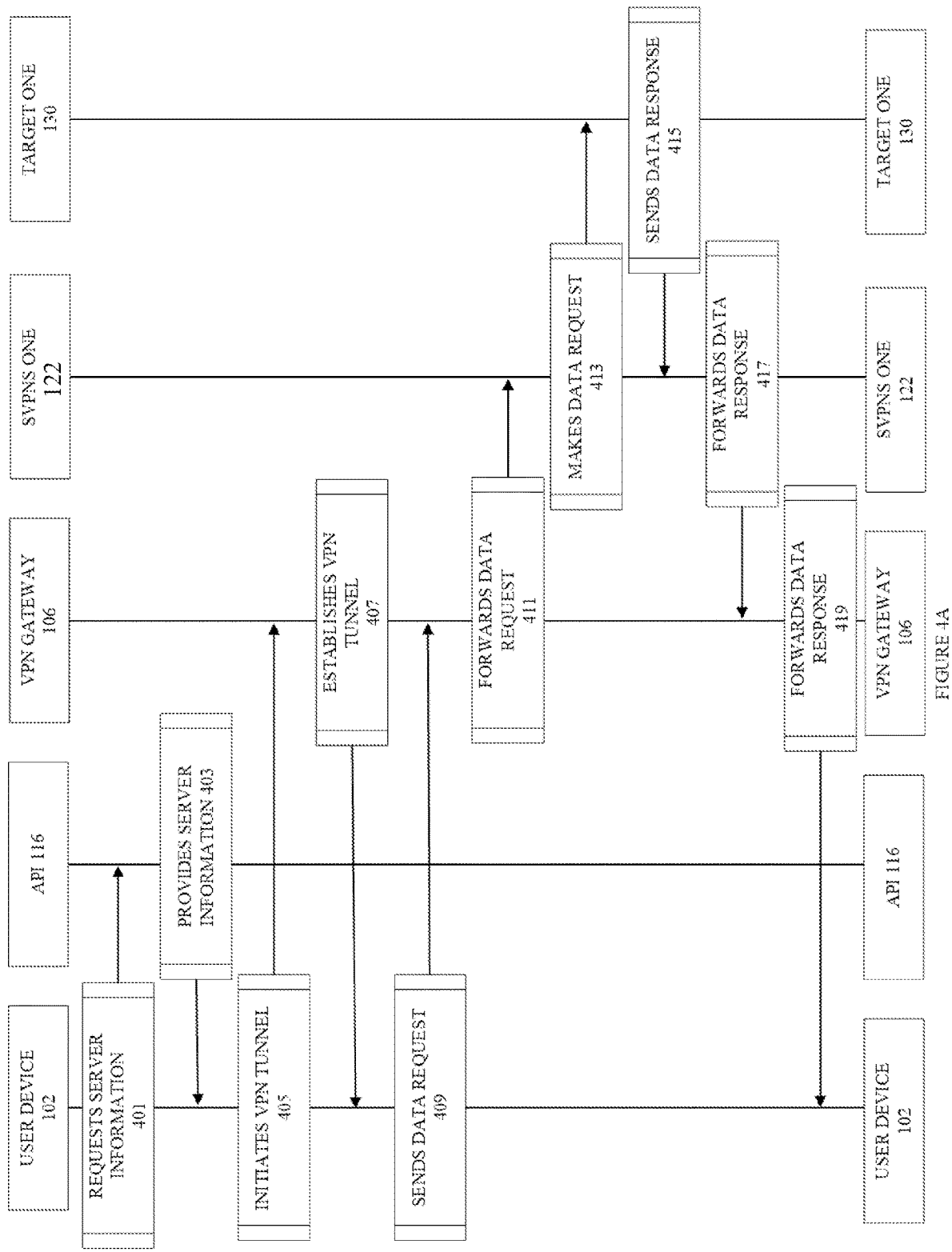
FIG. 4A shows an exemplary flow diagram of server defined multiserver routing.

FIG. 4A shows an exemplary flow diagram of server defined multiserver routing.

In step 401, User Device 102 initiates a process to authenticate with the API 116. User Device 102 can be authenticated using a variety of methods consisting of providing a username and a password or other identifying information.

In step 403, API 116 confirms the identity of User Device 102 and authenticates it. API 116 also provides a list of VPN servers available for connection at that time. One of those servers available to User Device 102 is PVPNS 104.

In step 405, User Device 102 initiates a VPN connection with PVPNS 104 and more specifically by addressing VPN Gateway 106. This action on User Device 102 can happen through a software application installed on User Device 102 that has a dashboard or other user interface. However, User Device 102 can engage in a VPN connection with the VPN Gateway 106 by configuring their system network settings more directly.

In step 407, once VPN Gateway 106 receives the request to connect, it creates a VPN tunnel between itself and User Device 102. The tunnel is established by VPN Gateway 106 receiving User Device 102 requests from its public IP address, then returning a response with a newly assigned private IP address and a private IP address of the VPN Gateway 106 through which User Device 102 can communicate with VPN Gateway 106 in a private way. All the subsequent communication is done through the tunnel created by User Device 102 and VPN Gateway 106. The connection is private (secure) because symmetric cryptography is used to encrypt the data transmitted. Usually, the keys for this symmetric encryption are generated uniquely for each connection and are based on a shared secret that was negotiated at the start of the session. The server and client negotiate the details of which encryption algorithm and cryptographic keys to use before the first byte of data is transmitted. The negotiation of a shared secret is both secure (the negotiated secret is unavailable to eavesdroppers and cannot be obtained, even by an attacker who places themselves in the middle of the connection) and reliable (no attacker can modify the communications during the negotiation without being detected).

The identity of the communicating parties can be authenticated using public-key cryptography. This authentication can be optional but is generally required for at least one of the parties (typically the server). The connection is reliable because each message transmitted includes a message integrity check using a message authentication code to prevent undetected loss or alteration of the data during transmission.

In step 409, after the VPN tunnel is established and secured, User Device 102 is able to make requests and access the target servers privately without its public IP being revealed. User's individual traffic consists of sending requests and receiving responses as well as other protocol-specific information exchange, like TCP handshakes, cryptographic key exchange, and others. Since the primary VPN server does not analyze the user's traffic to the detail of individual requests, it deals with traffic more generally, i.e. the flow of information from and to its user. However, for the sake of clarity we will use requests and responses as discrete entities to illustrate the flow of actions. However, actions by the primary VPN server are not limited to these individual datagrams. These actions are also not limited by a particular protocol. For example, the traffic can consist of TCP or UDP packets and datagrams.

User Device 102 makes a request to access a domain Target One 130 (for example, a web page, a video streaming service, a gaming or gambling platform) and sends it to VPN Gateway 106.

In step 411, VPN Gateway 106 receives the data request from User Device 102 and selects a default routing to an exit VPN server that will ultimately make a request to Target One 130. The choice by default is made upon some preset rules or rules updated manually at PVPNS 104. The choice can also be made by considering several factors, for example server proximity to Target One 120 or User Device 102 but this does not change the overall functionality of the embodiments. In this case, VPN Gateway 106 can choose SVPNS One 122 as the exit VPN server and forward the request from User Device 102 to SVPNS One 122.

The internal communication between entities of the VPN service provider infrastructure can be exchanged in a variety of ways and protocols, including but not limited to IP in IP (Protocol 4): IP in IPv4/IPv6; SIT/IPv6 (Protocol 41): IPv6 in IPv4/IPv6; GRE (Protocol 47): Generic Routing Encapsulation; OpenVPN (UDP port 1194); SSTP (TCP port 443): Secure Socket Tunneling Protocol; IPSec (Protocol 50 and 41): Internet Protocol Security; L2TP (Protocol 115): Layer 2 Tunneling Protocol; VXLAN (UDP port 4789): Virtual Extensible Local Area Network; WireGuard; Quic. However, it is desirable that the communication takes place over an encrypted protocol, like a VPN tunnel, so that the data exchanged is encrypted and cannot be intercepted.

In step 413, SVPNS One 122 makes a request to Target One 130 for the data specified in the original request from User Device 102. The type of data can be an HTTP response, a streaming service or any other media or data entity. The applications of the current embodiments are not limited by a particular protocol or the type of target that is being accessed.

In step 415, Target One 130 returns the data specified in the original request from User Device 102 to SVPNS One 122.

In step 417, SVPNS One 122 forwards the data received from Target One 130 to VPN Gateway 106.

In step 419, VPN Gateway 106 returns the request data to User Device 102 over the existing VPN tunnel.

The data exchange described above in steps 409 and 419 forms a complete cycle and can be reiterated multiple times before any changes are made to the existing communication. The rates of the cycle are flexible and can include, for example, one, one hundred, one thousand or ten thousand instances. During the cycle, all elements remain stable and User Device 102 sends all requests to PVPNS 104 and then they are routed via SVPNS One 122.

Figure 4B:
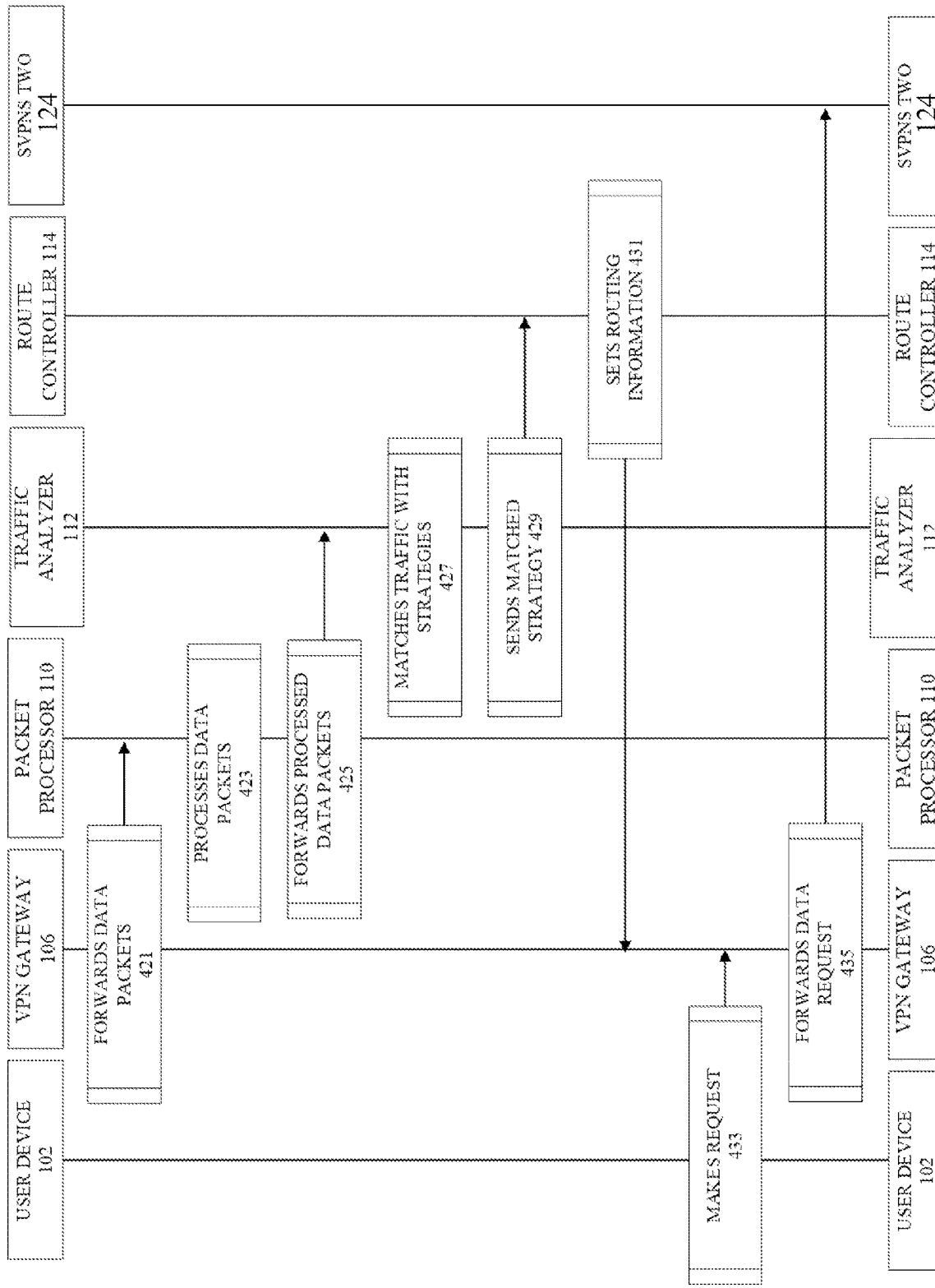
FIG. 4B shows the continuation of the exemplary flow diagram of server defined multiserver routing.

FIG. 4B shows the continuation of the exemplary flow diagram of server defined multiserver routing.

In step 421, VPN Gateway 106 forwards unencrypted data packets to Packet Processor 110. These data packets can be forwarded individually, as a constant stream or they can be aggregated and only forwarded when a certain number of packets is reached or at preset intervals. The forwarding and the further analysis of the packets and the aggregated traffic can take place asynchronously with the previous data exchange cycle. This means that the transfer of data for analysis can be constant or happen at the same time or independently from the data exchange cycle that forwards and executes requests by User Device 102. The differentiation of data exchange cycles into asynchronous processes ensures that the requests of User Device 102 can be executed without waiting for any other processes to finish and thus no delays occur. Likewise, analysis can happen at the same time that the requests are executed.

In step 423, Packet Processor 110 processes the data packets. Processing of data packets refers to extracting certain information from data packets. The extracted information can be indicative of locations or countries of origin and target, network connection type, also dynamic parameters, like timestamps, session duration, timestamps of idleness, a session's total traffic, response time, latency; such data can also include aggregated dynamic parameters over any period of time (average speed, average data packet size, average response time, average latency, most/least visited targets, error rate, variations in which median and percentile groups are used instead of average values, and others) in any combination and with any weights associated with the parameters. In most applications of the current embodiments, the goal of processing data packets is to arrive at an aggregated data model that is suitable for matching with existing routing strategies. Packet Processor 110 can save aggregation conclusions about the data packets as metadata.

In step 425, Packet Processor 110 forwards the processed data packets or metadata regarding them to Traffic Analyzer 112. Traffic Analyzer 112 uses the received data (whether in processed data packet form or metadata form) to match it with existing routing strategies that will determine the secondary (exit) VPN server.

Traffic Analyzer 112 should have a set of routing strategies performed in a flow of information exemplified in FIG. 3, steps 301 and 303.

The processing load is distributed between Packet Processor 110 and Traffic Analyzer 112. In some embodiments, the needed data features can be extracted at one entity or the other without changing the overall functionality of the embodiments. For example, Packet Processor 110 can aggregate data without extracting features and Traffic Analyzer 112 can extract features or Packet Processor 110 can already have relevant features processed before forwarding it to Traffic Analyzer 112.

Traffic Analyzer 112 matches traffic with strategies based on an algorithm that does not change the overall functionality of the embodiments. Analysis can take as parameters protocols used for the connections within the traffic information, target IP addresses, their ranges and locations, and target ports can be indicative of particular types of services accessed. Any type of algorithm could be implemented that matches particular traffic with the optimal routing strategy. Examples of algorithmic operations include but are not limited to grouping data in categories, forming series of data (ordered, partially ordered or unordered), aggregating data, extracting aggregated results, performing statistical analysis, running machine learning and deep learning algorithms, forming predictive models, and other processing functions. Traffic Analyzer 112 can run multiple related mechanisms that determine the outcome together.

Steps 421-427 form a complete cycle of information transfer in the case in which a strategy match is not found for the relevant traffic. In other words, if no match is found by Traffic Analyzer 112 for processed data packets, then no decision to change routing is made and the default routing remains valid. In such a case, however, packets will continue to be analyzed for future potential matches and steps 421-427 can be reiterated. If a match is found, then the following actions are performed.

In step 429, Traffic Analyzer 112 communicates the matching strategy to Route Controller 114. The information communicated from Traffic Analyzer 112 to Route Controller 114 can be indicative of the secondary (exit) VPN server that should be used for optimal routing of this particular traffic. In the current embodiment, the optimal secondary (exit) VPN server is SVPNS Two 124.

In step 431, Route Controller 114 receives the routing strategy from Traffic Analyzer 112 and formulates an appropriate routing rule that corresponds to the routing strategy. In one embodiment, the strategy indicates to reach Target One 130 not via SVPNS One 122 as defined in the default routing and executed in the previous data exchange cycles in steps 409-419, but via SVPNS Two 124. In other words, Traffic Analyzer 112 found a strategy that matched the analyzed traffic that shows that it is optimal to reroute the traffic via SVPNS Two 124. Route Controller 114 identifies this strategy and makes a routing rule to that effect that it forwards to VPN Gateway 106.

In one example, the embodiments begin the routing with the first SYN packet received or, in the case of UDP, a stateful NAT can be employed to route traffic.

In step 433, after the routing strategy has been implemented at VPN Gateway 106, User Device 102 makes a request to access a domain Target One 130 (the same target as in the previous data exchange cycles) and sends it to VPN Gateway 106.

In step 435, VPN Gateway 106 receives the data request from User Device 102 and selects the preferred routing to an exit VPN server that was indicated in a routing strategy. In this data exchange cycle, VPN Gateway 106 does not choose SVPNS One 122 as the exit VPN server and routes the request to SVPNS Two 124. It is desirable that the communication takes place over an encrypted protocol, like a VPN tunnel, so that the data exchanged is encrypted and cannot be intercepted.

Figure 4C:
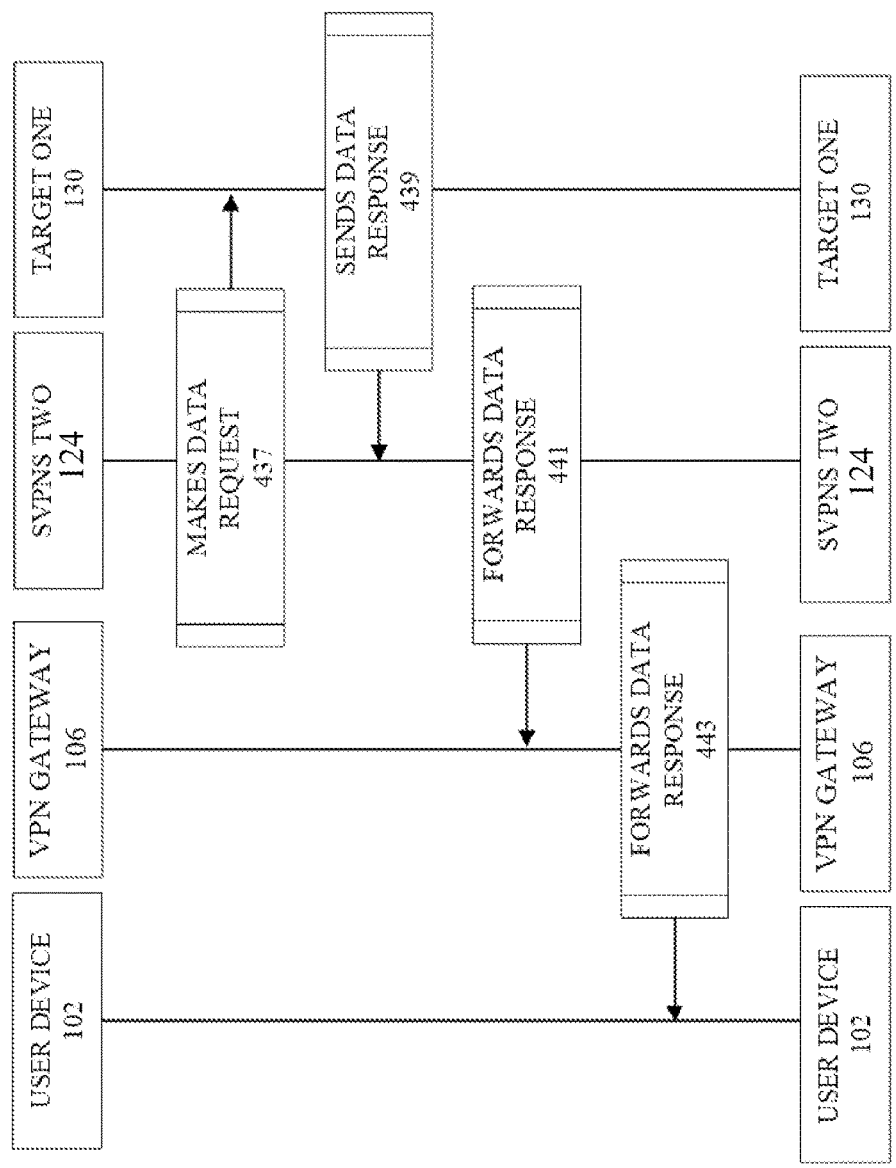
FIG. 4C shows the continuation of the exemplary flow diagram of server defined multiserver routing.

FIG. 4C shows the continuation of the exemplary flow diagram of server defined multiserver routing.

In step 437, SVPNS Two 124 makes a request to Target One 130 for the data specified in the request from User Device 102. The type of data can be an HTTP response, a streaming service or any other media or data entity. The applications of the current embodiments are not limited by a particular protocol or the type of target that is being accessed.

In step 439, Target One 130 returns the data specified in the original request from User Device 102 to SVPNS Two 124.

In step 441, SVPNS Two 124 forwards the data received from Target One 130 to VPN Gateway 106.

In step 443, VPN Gateway 106 returns the request data to User Device 102 over the existing VPN tunnel.

The data exchange described in steps 433 and 443 forms a complete cycle and can be reiterated multiple times before any changes are made to the existing communication. The rates of the cycle are flexible and can include, for example, one, one hundred, one thousand or ten thousand instances. However, during this cycle, User Device 102 sends all requests to PVPNS 104 and they are routed via SVPNS Two 124. This type of connection constitutes a multiserver VPN connection.

Figure 5A:
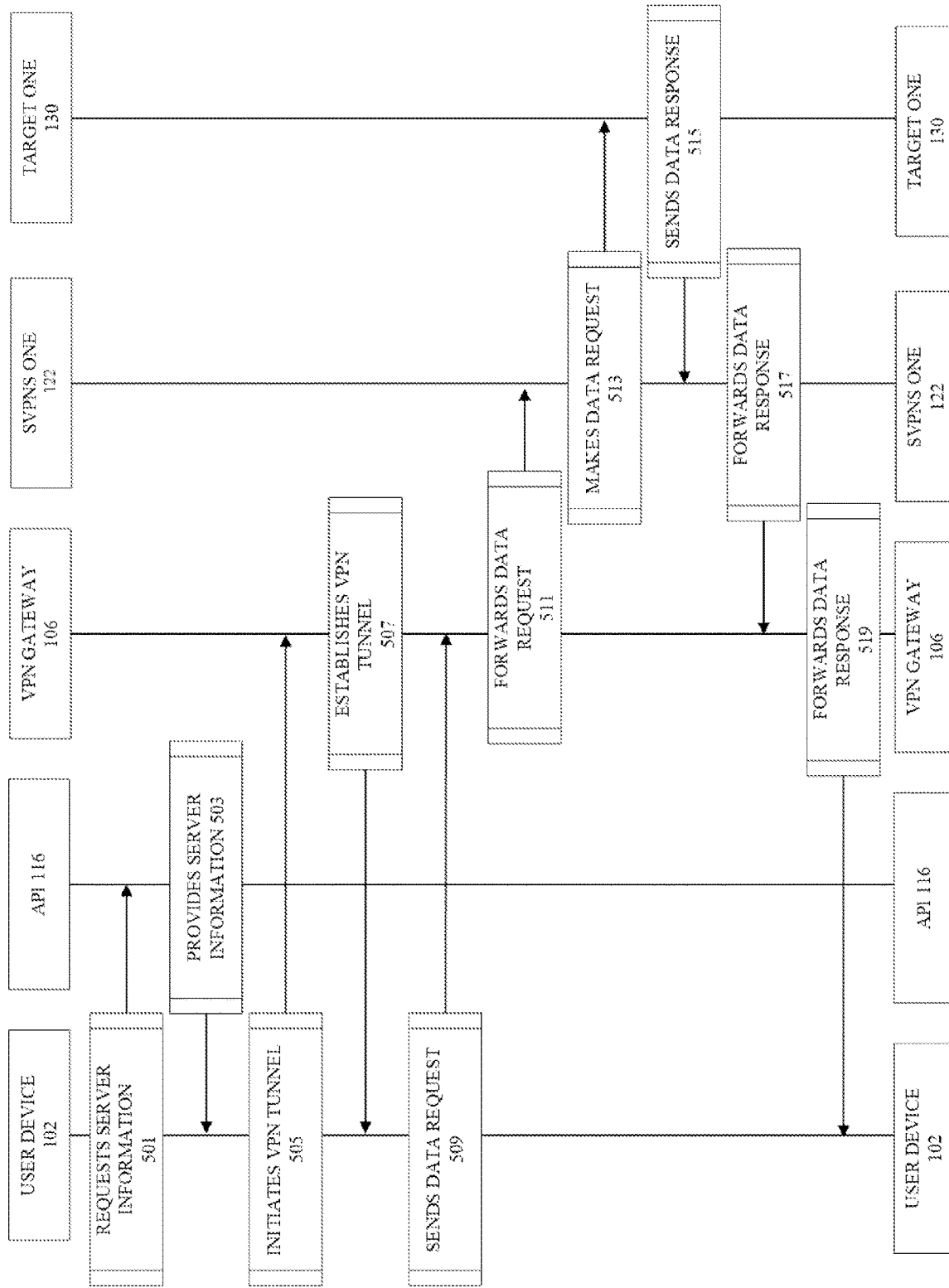
FIG. 5A shows an exemplary flow diagram of server defined multiserver routing with split traffic.

FIG. 5A shows an exemplary flow diagram of server defined multiserver routing with split traffic.

In step 501, User Device 102 initiates a process to authenticate with the API 116. User Device 102 can be authenticated using a variety of methods consisting of providing a username and a password or other identifying information.

In step 503, API 116 confirms the identity of User Device 102 and authenticates it. API 116 also provides a list of VPN servers available for connection at that time. One of those servers available to User Device 102 is PVPNS 104.

In step 505, User Device 102 initiates a VPN connection with PVPNS 104 and more specifically by addressing VPN Gateway 106. This action on User Device 102 can happen through a software application installed on User Device 102 that has a dashboard or other user interface. However, User Device 102 can engage in a VPN connection with the VPN Gateway 106 by configuring their system network settings more directly.

In step 507, once VPN Gateway 106 receives the request to connect, it creates a VPN tunnel between itself and User Device 102. The tunnel is established by VPN Gateway 106 receiving User Device 102 requests from its public IP address, then returning a response with a newly assigned private IP address and a private IP address of the VPN Gateway 106 through which User Device 102 can communicate with VPN Gateway 106 in a private way. All the subsequent communication is done through the tunnel created by User Device 102 and VPN Gateway 106.

The identity of the communicating parties can be authenticated using public-key cryptography. This authentication can be optional but is generally required for at least one of the parties (typically the server). The connection is reliable because each message transmitted includes a message integrity check using a message authentication code to prevent undetected loss or alteration of the data during transmission.

In step 509, after the VPN tunnel is established and secured, User Device 102 is able to make requests and access the target servers privately without its public IP being revealed. User's individual traffic consists of sending requests and receiving responses as well as other protocol-specific information exchange, like TCP handshakes, cryptographic key exchange, and others. Since the primary VPN server does not analyze the user's traffic to the detail of individual requests, it deals with traffic more generally, i.e. the flow of information from and to its user. However, for the sake of clarity we will use requests and responses as discrete entities to illustrate the flow of actions. However, actions by the primary VPN server are not limited to these individual datagrams. These actions are also not limited by a particular protocol. For example, the traffic can consist of TCP or UDP packets and datagrams.

User Device 102 makes a request to access a domain Target One 130 (for example, a web page, a video streaming service, a gaming or gambling platform) and sends it to VPN Gateway 106.

In step 511, VPN Gateway 106 receives the data request from User Device 102 and selects a default routing to an exit VPN server that will ultimately make a request to Target One 130. The choice by default is made upon some preset rules or rules updated manually at PVPNS 104. The choice can also be made by considering several factors, for example server proximity to Target One 120 or User Device 102 but this does not change the overall functionality of the embodiments. In this case, VPN Gateway 106 can choose SVPNS One 122 as the exit VPN server and forward the request from User Device 102 to SVPNS One 122.

The internal communication between entities of the VPN service provider infrastructure can be exchanged in a variety of ways and protocols, including but not limited to IP in IP (Protocol 4): IP in IPv4/IPv6; SIT/IPv6 (Protocol 41): IPv6 in IPv4/IPv6; GRE (Protocol 47): Generic Routing Encapsulation; OpenVPN (UDP port 1194); SSTP (TCP port 443): Secure Socket Tunneling Protocol; IPSec (Protocol 50 and 51): Internet Protocol Security; L2TP (Protocol 115): Layer 2 Tunneling Protocol; VXLAN (UDP port 4789): Virtual Extensible Local Area Network; WireGuard; Quic. However, it is desirable that the communication takes place over an encrypted protocol, like a VPN tunnel, so that the data exchanged is encrypted and cannot be intercepted.

In step 513, SVPNS One 122 makes a request to Target One 130 for the data specified in the original request from User Device 102. The type of data can be an HTTP response, a streaming service or any other media or data entity. The applications of the current embodiments are not limited by a particular protocol or the type of target that is being accessed.

In step 515, Target One 130 returns the data specified in the original request from User Device 102 to SVPNS One 122.

In step 517, SVPNS One 122 forwards the data received from Target One 130 to VPN Gateway 106.

In step 519, VPN Gateway 106 returns the request data to User Device 102 over the existing VPN tunnel.

The data exchange described above in steps 509 and 519 forms a complete cycle and can be reiterated multiple times before any changes are made to the existing communication. One significant exception to this is that the target server can change. This means that User Device 102 can access different targets via the default routing, for example, including Target Two 132. The rates of the cycle are flexible and can include, for example, one, one hundred, one thousand or ten thousand instances. During the cycle, all elements remain stable and User Device 102 sends all requests to PVPNS 104 and then they are routed via SVPNS One 122.

Figure 5B:
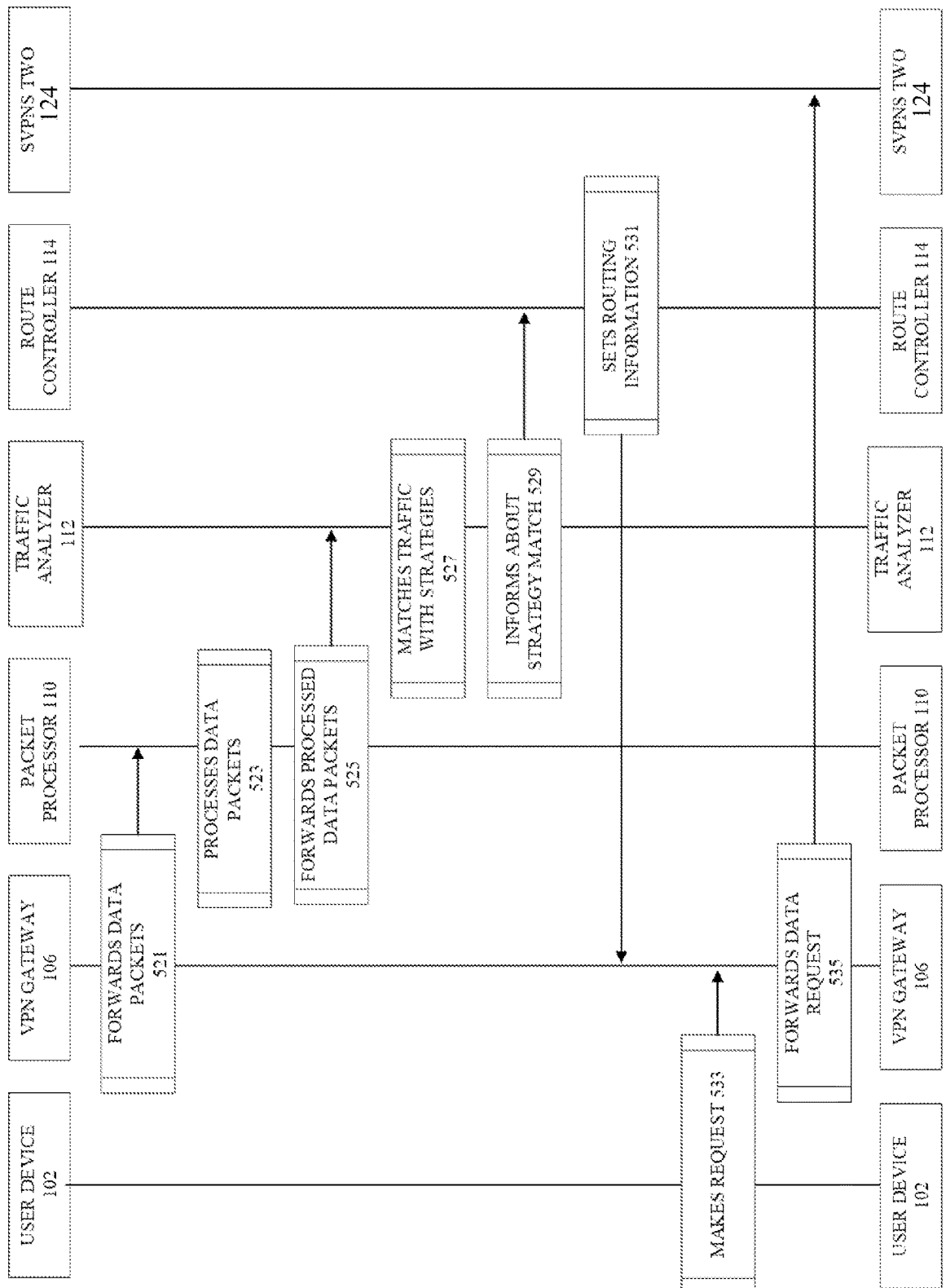
FIG. 5B shows the continuation of the exemplary flow diagram of server defined multiserver routing with split traffic.

FIG. 5B shows the continuation of the exemplary flow diagram of server defined multiserver routing with split traffic.

In step 521, VPN Gateway 106 forwards unencrypted data packets to Packet Processor 110. These data packets can be forwarded individually, as a constant stream or they can be aggregated and only forwarded when a certain number of packets is reached or at preset intervals. The forwarding and the further analysis of the packets and the aggregated traffic can take place asynchronously with the previous data exchange cycle. This means that the transfer of data for analysis can be constant or happen at the same time or independently from the data exchange cycle that forwards and executes requests by User Device 102. The differentiation of data exchange cycles into asynchronous processes ensures that the requests of User Device 102 can be executed without waiting for any other processes to finish and thus no delays occur. Likewise, analysis can happen at the same time that the requests are executed. The forwarding and the further analysis of the packets and the aggregated traffic can take place asynchronously with the previous data exchange cycle. This means that the transfer of data for analysis can be constant or happen at the same time or independently from the data exchange cycle that forwards and executes requests by User Device 102. The differentiation of data exchange cycles into asynchronous processes ensures that the requests of User Device 102 can be executed without waiting for any other processes to finish and thus no delays occur. Likewise, analysis can happen at the same time that the requests are executed.

In step 523, Packet Processor 110 processes the data packets. Processing of data packets refers to extracting certain information from data packets. The extracted information can be indicative of locations or countries of origin and target, network connection type, also dynamic parameters, like timestamps, session duration, timestamps of idleness, a session's total traffic, response time, latency; such data can also include aggregated dynamic parameters over any period of time (average speed, average data packet size, average response time, average latency, most/least visited targets, error rate, variations in which median and percentile groups are used instead of average values, and others) in any combination and with any weights associated with the parameters. In most applications of the current embodiments, the goal of processing data packets is to arrive at an aggregated data model that is suitable for matching with existing routing strategies. Packet Processor 110 can save aggregation conclusions about the data packets as metadata.

In step 523, Packet Processor 110 forwards the processed data packets or metadata regarding them to Traffic Analyzer 112. Traffic Analyzer 112 uses the received data (whether in processed data packet form or metadata form) to match it with more than one existing routing strategy that will determine the secondary (exit) VPN server. More than one strategy is matched with characteristics of traffic indicative of different services used or content access on the web or other entities accessible via a network. This means that different parts of the traffic correspond to different strategies that can be implemented simultaneously. Therefore, the same traffic incoming from User Device 102 can be routed via more than one secondary (exit) VPN server at the same time or in close succession. This can be called split traffic multiserver routing.

Traffic Analyzer 112 should have a set of routing strategies performed in a flow of information exemplified in FIG. 3, steps 301 and 303, and match parts of the traffic with the strategies.

The processing load is distributed between Packet Processor 110 and Traffic Analyzer 112. In some embodiments, the needed data features can be extracted at one entity or the other without changing the overall functionality of the embodiments. For example, Packet Processor 110 can aggregate data without extracting features and Traffic Analyzer 112 can extract features or Packet Processor 110 can already have relevant features processed before forwarding it to Traffic Analyzer 112.

Traffic Analyzer 112 matches parts of traffic with more than one strategy based on an algorithm that does not change the overall functionality of the embodiments. Any type of algorithm could be implemented that matches particular traffic with the optimal routing strategy. Examples of algorithmic operations include but are not limited to grouping data in categories, forming series of data (ordered, partially ordered or unordered), aggregating data, extracting aggregated results, performing statistical analysis, running machine learning and deep learning algorithms, forming predictive models, and other processing functions. Traffic Analyzer 112 can run multiple related mechanisms that determine the outcome together.

Steps 521-527 form a complete cycle of information transfer in the case in which a strategy match is not found for the relevant traffic. In other words, if no match is found by Traffic Analyzer 112 for processed data packets, then no decision to change routing is made and the default routing remains valid. In such a case, however, packets will continue to be analyzed for future potential matches.

In step 529, Traffic Analyzer 112 communicates the matching strategies to Route Controller 114. The information communicated from Traffic Analyzer 112 to Route Controller 114 can be indicative of the secondary (exit) VPN server that should be used for optimal routing of this particular traffic. In the current embodiment, the two optimal secondary (exit) VPN servers are SVPNS Two 124 and SVPNS Three 128.

In step 531, Route Controller 114 receives the routing strategy from Traffic Analyzer 112 and formulates appropriate routing rules that correspond to the routing strategies. In one embodiment, the strategy indicates to reach Target One 130 not via SVPNS One 122 as defined in the default routing and executed in the previous data exchange cycles in steps 509-519, but via SVPNS Two 124 and to reach Target Two 132 not via SVPNS One 122 but via SVPNS Three 126.

In one example, the embodiments begin the routing with the first SYN packet received or, in the case of UDP, a stateful NAT can be employed to route traffic.

In other words, Traffic Analyzer 112 found two strategies that matched the analyzed traffic for optimal routing of the traffic via SVPNS Two 124 and SVPNS Three 126. Route Controller 114 identifies this strategy and makes a routing rule to that effect that it forwards to VPN Gateway 106.

In one example, the embodiments begin the routing with the first SYN packet received or, in the case of UDP, a stateful NAT can be employed to route traffic.

In step 533, after the routing strategy has been implemented at VPN Gateway 106, User Device 102 makes a request to access a domain Target One 130 and sends it to VPN Gateway 106.

Figure 5C:
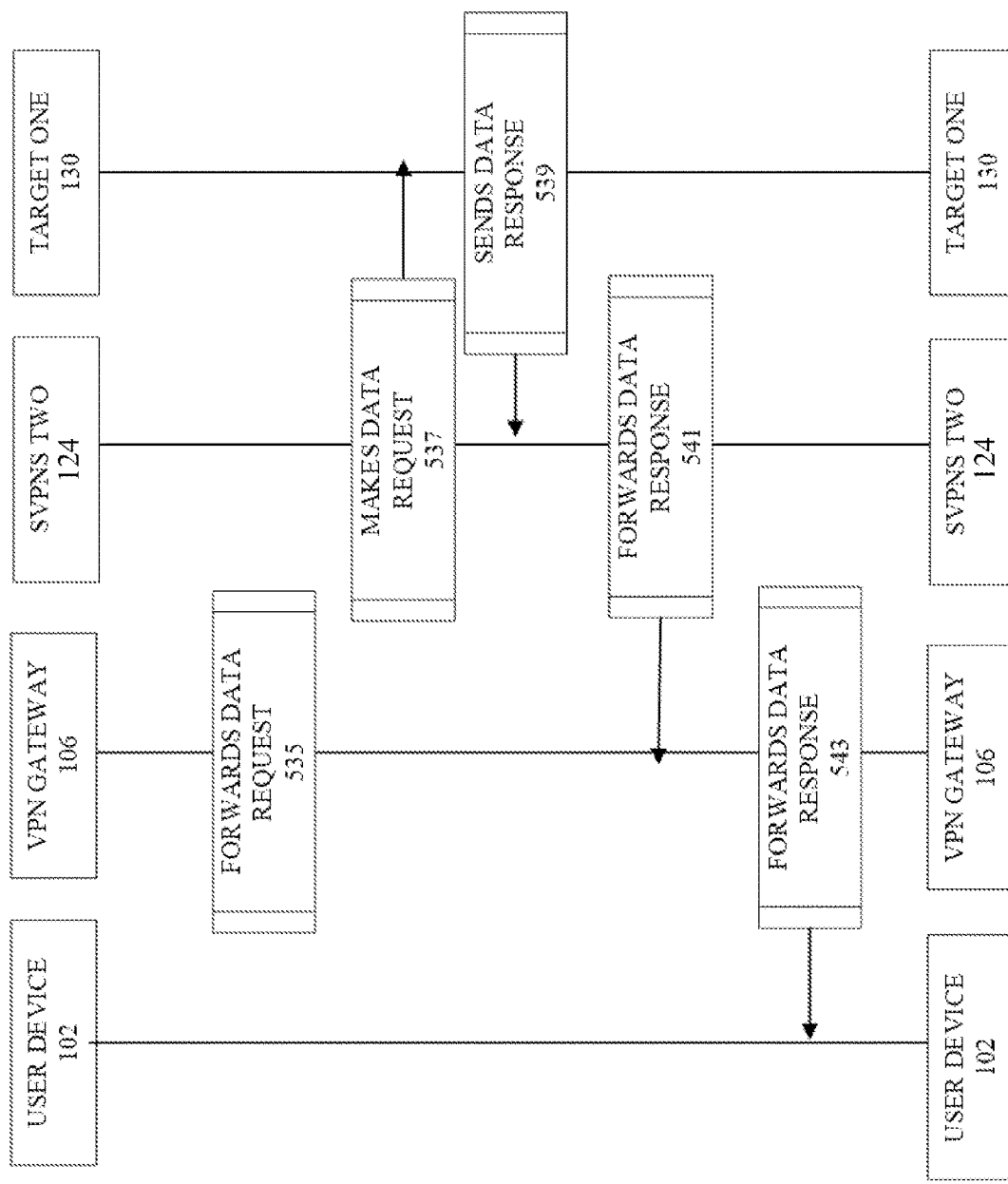
FIG. 5C shows the continuation of the exemplary flow diagram of server defined multiserver routing with split traffic.

FIG. 5C shows the continuation of the exemplary flow diagram of server defined multiserver routing with split traffic.

In step 535, VPN Gateway 106 receives the data request from User Device 102 and selects the optimal routing to an exit VPN server that was indicated in a routing strategy optimized for Target One 130. As indicated in the split strategy, VPN Gateway 106 routes the request to Target One 130 via SVPNS Two 124. It is desirable that the communication takes place over an encrypted protocol, like a VPN tunnel, so that the data exchanged is encrypted and cannot be intercepted.

In step 537, SVPNS Two 124 makes a request to Target One 130 for the data specified in the request from User Device 102. The type of data can be an HTTP response, a streaming service or any other media or data entity. The applications of the current embodiments are not limited by a particular protocol or the type of target that is being accessed.

In step 539, Target One 130 returns the data specified in the original request from User Device 102 to SVPNS Two 124.

In step 541, SVPNS Two 124 forwards the data received from Target One 130 to VPN Gateway 106.

In step 543, VPN Gateway 106 returns the request data to User Device 102 over the existing VPN tunnel.

Figure 5D:
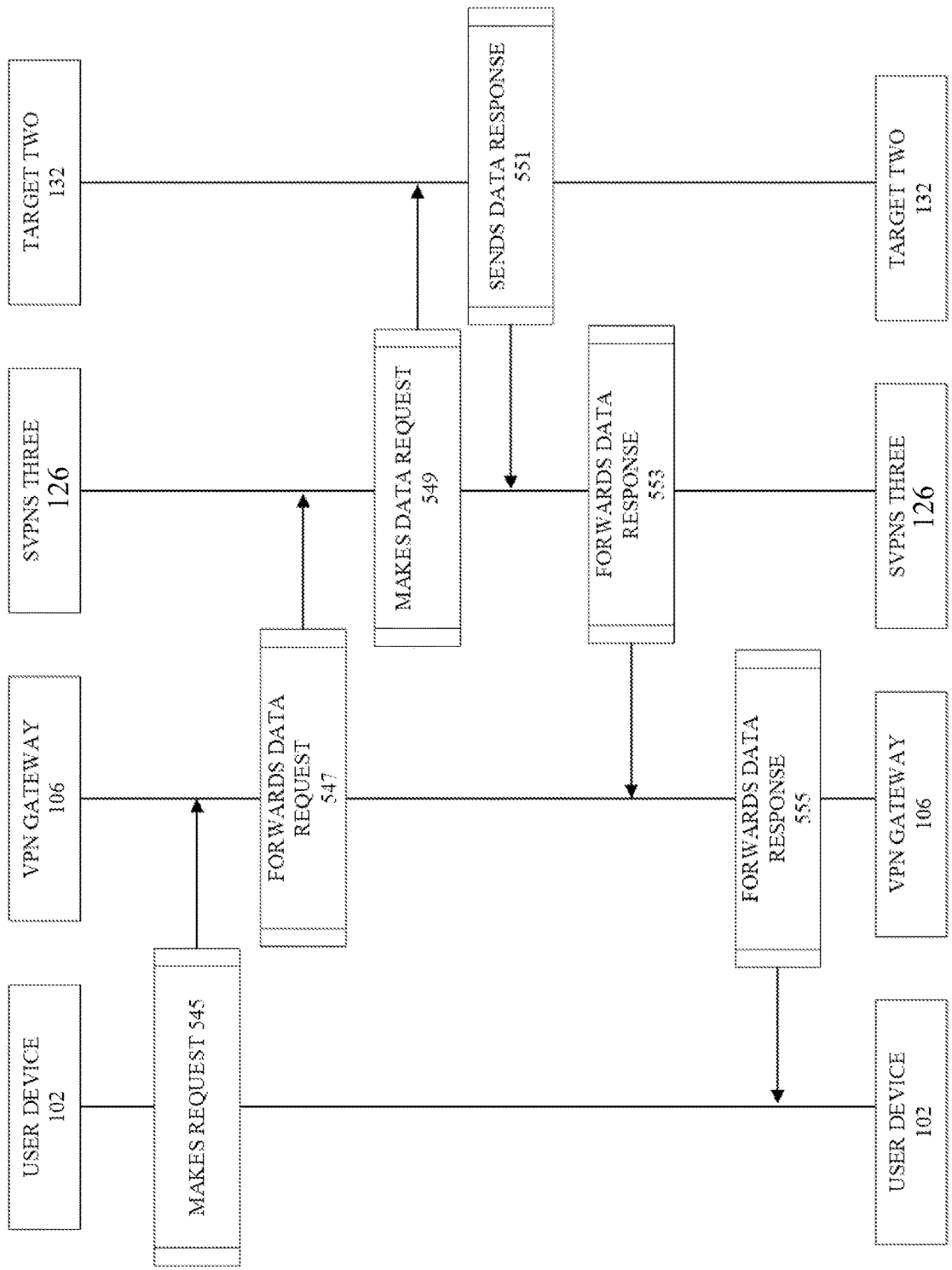
FIG. 5D shows the continuation of the exemplary flow diagram of server defined multiserver routing with split traffic.

FIG. 5D shows the continuation of the exemplary flow diagram of server defined multiserver routing with split traffic.

In step 545, after the routing strategy has been implemented at VPN Gateway 106, User Device 102 makes a request to access a domain Target Two 132 and sends it to VPN Gateway 106.

In step 547, VPN Gateway 106 receives the data request from User Device 102 and selects the optimal routing to an exit VPN server that was indicated in a routing strategy optimized for Target Two 132. As indicated in the split strategy, VPN Gateway 106 routes the request to Target Two 132 via SVPNS Three 126. It is desirable that the communication takes place over an encrypted protocol, like a VPN tunnel, so that the data exchanged is encrypted and cannot be intercepted.

In step 549, SVPNS Three 126 makes a request to Target Two 132 for the data specified in the request from User Device 102. The type of data can be an HTTP response, a streaming service or any other media or data entity. The applications of the current embodiments are not limited by a particular protocol or the type of target that is being accessed.

In step 551, Target Two 132 returns the data specified in the original request from User Device 102 to SVPNS Three 126.

In step 553, SVPNS Three 126 forwards the data received from Target Two 132 to VPN Gateway 106.

In step 555, VPN Gateway 106 returns the request data to User Device 102 over the existing VPN tunnel.

The data exchange described in steps 533 and 555 forms a complete cycle and can be reiterated multiple times before any changes are made to the existing communication. The rates of the cycle are flexible and can include, for example, one, one hundred, one thousand or ten thousand instances. However, during this cycle, User Device 102 sends all requests to PVPNS 104 and they are routed via SVPNS Two 124 and SVPNS Three 126. This type of connection constitutes a split traffic multiserver VPN connection.

The sequence in the data exchange described in steps 533 and 555 is not strict and the two requests from User Device 102 (for Target One 130 and Target Two 132) can be serviced simultaneously. In some embodiments, the first request made can even be serviced later than the second request because of network latency.

Figure 6A:
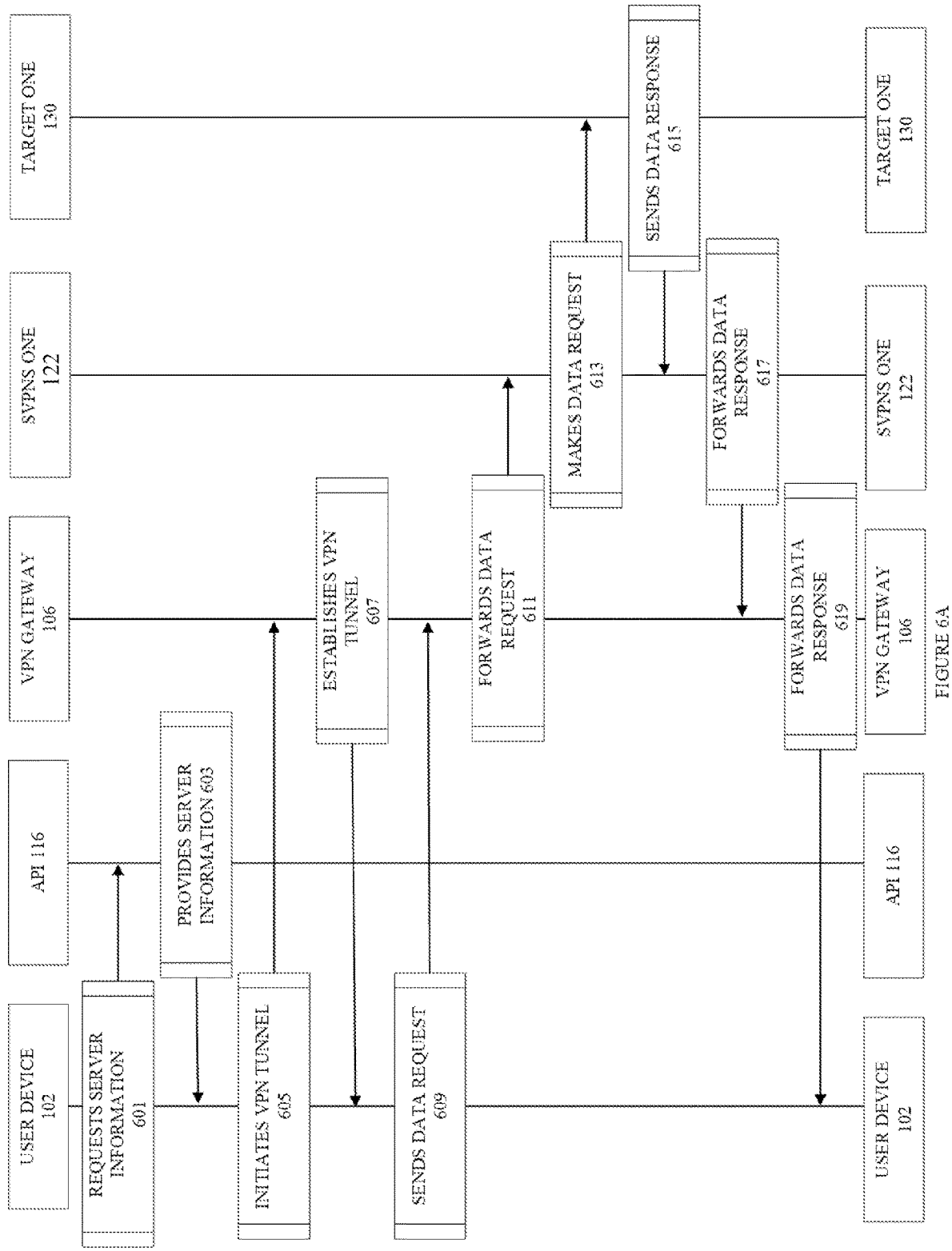
FIG. 6A shows an exemplary flow diagram of server defined and user defined multiserver routing.

FIG. 6A shows an exemplary flow diagram of server defined and user defined multiserver routing.

In step 601, User Device 102 initiates a process to authenticate with the API 116. User Device 102 can be authenticated using a variety of methods consisting of providing a username and a password or other identifying information.

In step 603, API 116 confirms the identity of User Device 102 and authenticates it. API 116 also provides a list of VPN servers available for connection at that time. One of those servers available to User Device 102 is PVPNS 104.

In step 605, User Device 102 initiates a VPN connection with PVPNS 104 and more specifically by addressing VPN Gateway 106. This action on User Device 102 can happen through a software application installed on User Device 102 that has a dashboard or other user interface. However, User Device 102 can engage in a VPN connection with the VPN Gateway 106 by configuring their system network settings more directly.

In step 607, once VPN Gateway 106 receives the request to connect, it creates a VPN tunnel between itself and User Device 102. The tunnel is established by VPN Gateway 106 receiving User Device 102 requests from its public IP address, then returning a response with a newly assigned private IP address and a private IP address of the VPN Gateway 106 through which User Device 102 can communicate with VPN Gateway 106 in a private way. All the subsequent communication is done through the tunnel created by User Device 102 and VPN Gateway 106.

The identity of the communicating parties can be authenticated using public-key cryptography. This authentication can be optional but is generally required for at least one of the parties (typically the server). The connection is reliable because each message transmitted includes a message integrity check using a message authentication code to prevent undetected loss or alteration of the data during transmission.

In step 609, after the VPN tunnel is established and secured, User Device 102 is able to make requests and access the target servers privately without its public IP being revealed. User's individual traffic consists of sending requests and receiving responses as well as other protocol-specific information exchange, like TCP handshakes, cryptographic key exchange, and others. Since the primary VPN server does not analyze the user's traffic to the detail of individual requests, it deals with traffic more generally, i.e. the flow of information from and to its user. However, for the sake of clarity we will use requests and responses as discrete entities to illustrate the flow of actions. However, actions by the primary VPN server are not limited to these individual datagrams. These actions are also not limited by a particular protocol. For example, the traffic can consist of TCP or UDP packets and datagrams.

User Device 102 makes a request to access a domain Target One 130 (for example, a web page, a video streaming service, a gaming or gambling platform) and sends it to VPN Gateway 106.

In step 611, VPN Gateway 106 receives the data request from User Device 102 and selects a default routing to an exit VPN server that will ultimately make a request to Target One 130. The choice by default is made upon some preset rules or rules updated manually at PVPNS 104. The choice can also be made by considering several factors, for example server proximity to Target One 120 or User Device 102 but this does not change the overall functionality of the embodiments. In this case, VPN Gateway 106 can choose SVPNS One 122 as the exit VPN server and forward the request from User Device 102 to SVPNS One 122.

The internal communication between entities of the VPN service provider infrastructure can be exchanged in a variety of ways and protocols, including but not limited to IP in IP (Protocol 4): IP in IPv4/IPv6; SIT/IPv6 (Protocol 41): IPv6 in IPv4/IPv6; GRE (Protocol 47): Generic Routing Encapsulation; OpenVPN (UDP port 1194); SSTP (TCP port 443): Secure Socket Tunneling Protocol; IPSec (Protocol 50 and 51): Internet Protocol Security; L2TP (Protocol 115): Layer 2 Tunneling Protocol; VXLAN (UDP port 4789): Virtual Extensible Local Area Network; WireGuard; Quic. However, it is desirable that the communication takes place over an encrypted protocol, like a VPN tunnel, so that the data exchanged is encrypted and cannot be intercepted.

In step 613, SVPNS One 122 makes a request to Target One 130 for the data specified in the original request from User Device 102. The type of data can be an HTTP response, a streaming service or any other media or data entity. The applications of the current embodiments are not limited by a particular protocol or the type of target that is being accessed.

In step 615, Target One 130 returns the data specified in the original request from User Device 102 to SVPNS One 122.

In step 617, SVPNS One 122 forwards the data received from Target One 130 to VPN Gateway 106.

In step 619, VPN Gateway 106 returns the request data to User Device 102 over the existing VPN tunnel.

The data exchange described above in steps 609 and 619 forms a complete cycle and can be reiterated multiple times before any changes are made to the existing communication. The rates of the cycle are flexible and can include, for example, one, one hundred, one thousand or ten thousand instances. During the cycle, all elements remain stable and User Device 102 sends all requests to PVPNS 104 and then they are routed via SVPNS One 122.

Figure 6B:
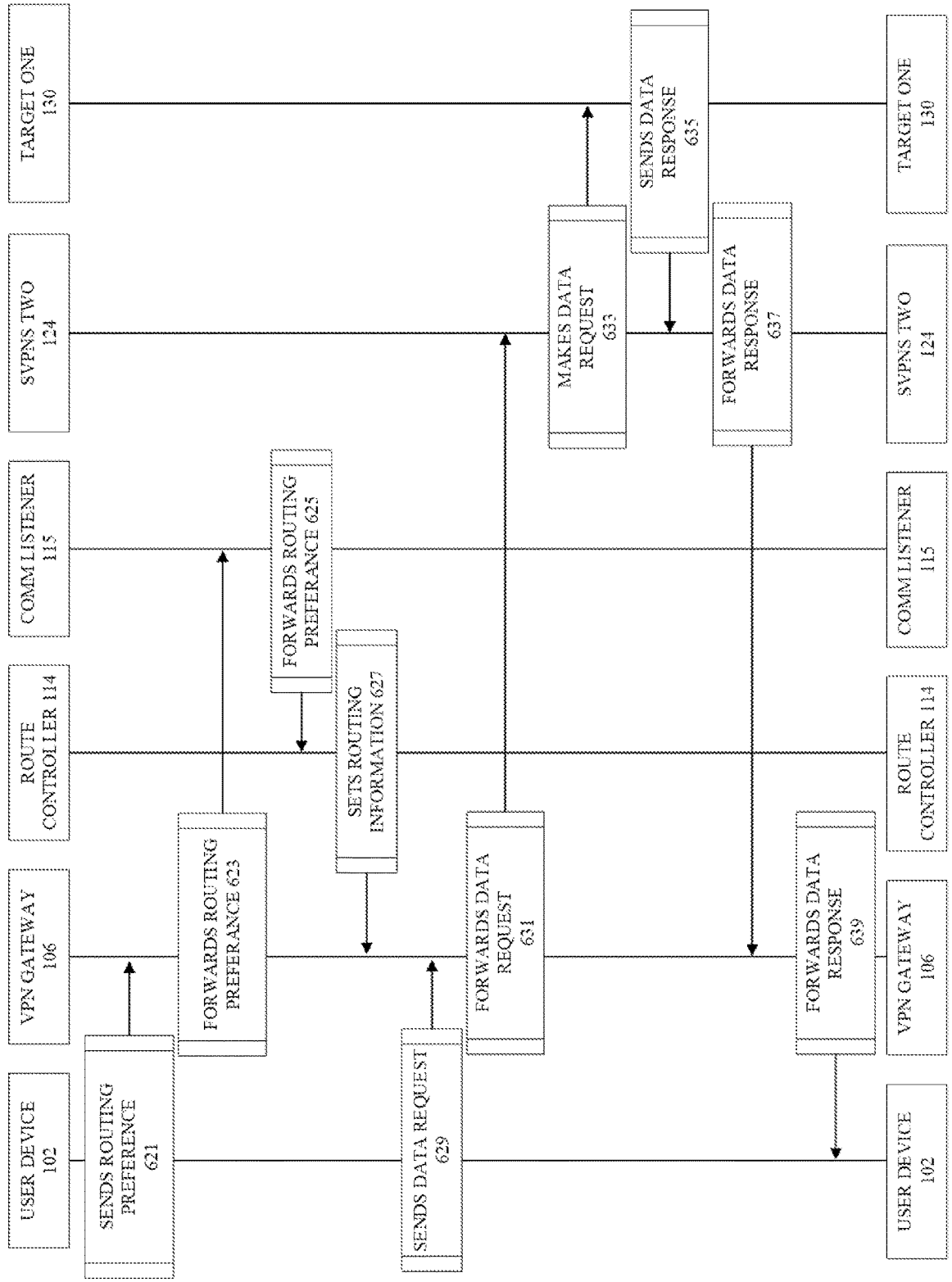
FIG. 6B shows the continuation of the exemplary flow diagram of server defined and user defined multiserver routing.
Figure 6C:
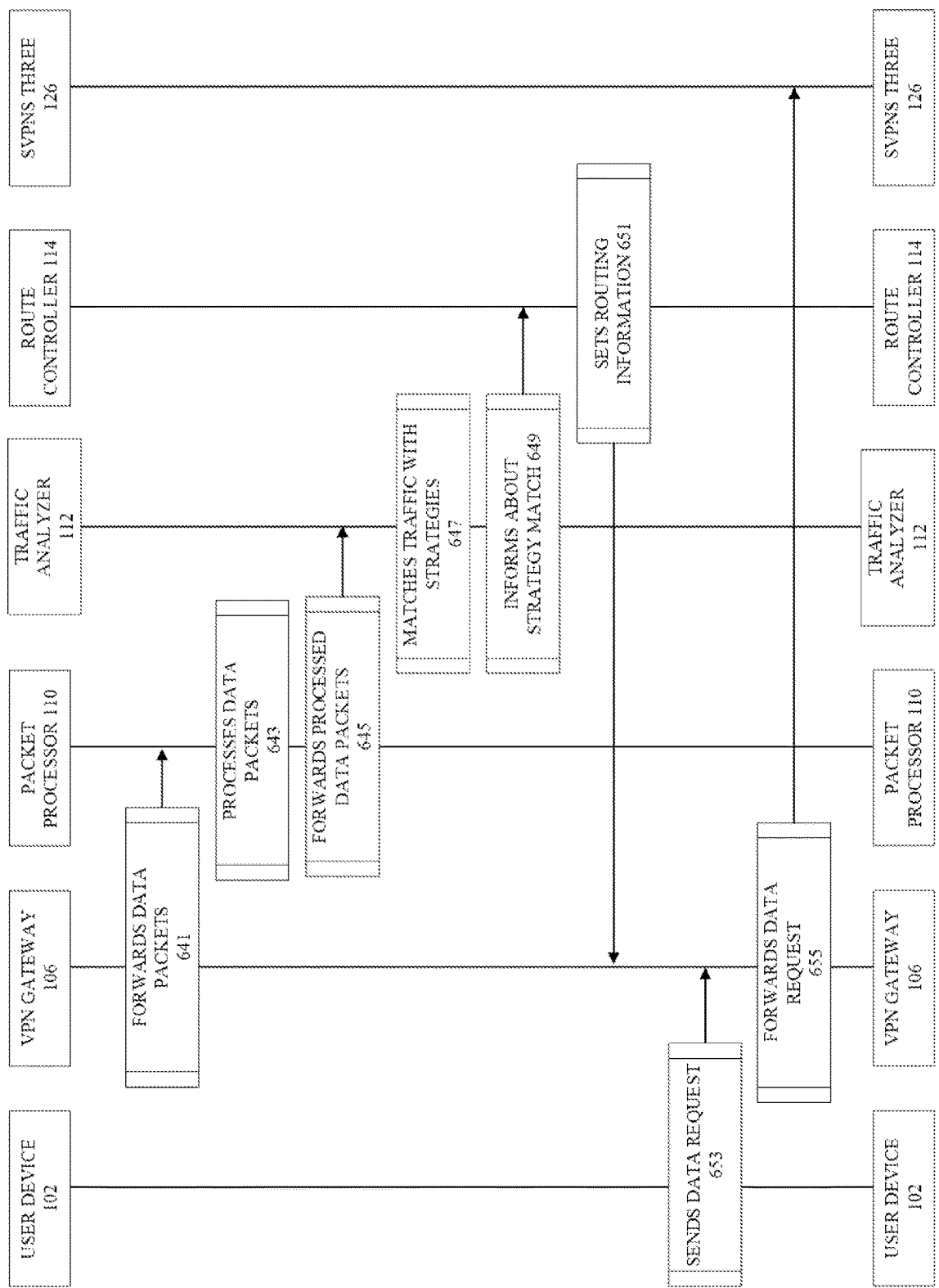
FIG. 6C shows the continuation of the exemplary flow diagram of server defined and user defined multiserver routing.
Figure 6D:
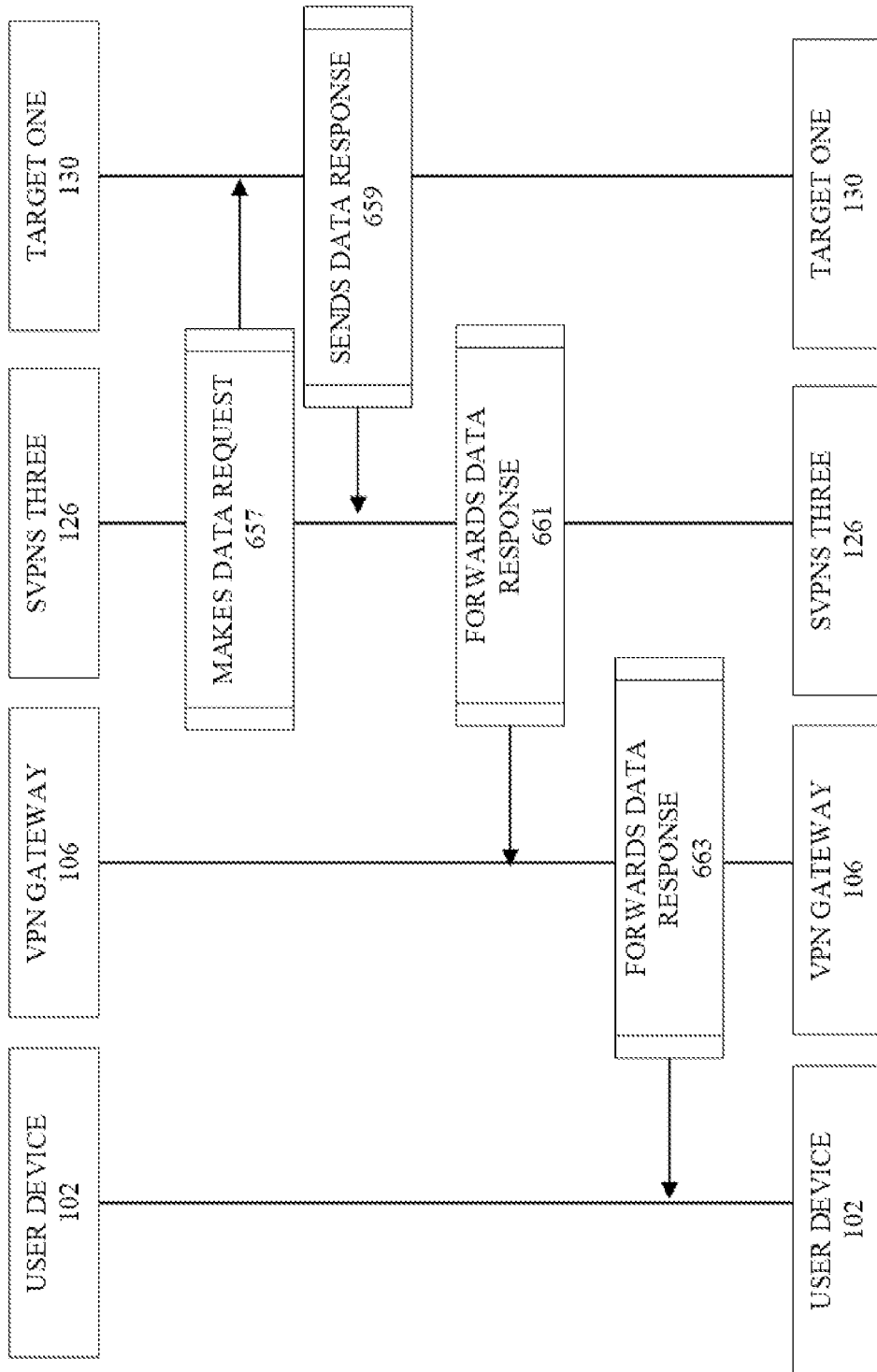
FIG. 6D shows the continuation of the exemplary flow diagram of server defined and user defined multiserver routing.

FIG. 6B shows the continuation of the exemplary flow diagram of server defined and user defined multiserver routing.

In step 621, User Device 102 sends a preference to VPN Gateway 106 that a different exit server should be used. That preference might be a freely formed request from User Device 102 but it can also be made available to User Device 102 via a dashboard or as a list of potential exit VPN servers.

The routing preference request is sent from a user with a destination address that belongs to the VPN service provider infrastructure, and more specifically to Comm Listener 115 which is a listening device or software that has a specific port open to specifically receive such requests from users. Thus, a routing preference request is different from other requests from User Device 102 in that it is addressed no to an external target server but to an element of PVPNS 104. The routing preference request is sent via the original VPN tunnel and thus is firstly addressed to VPN Gateway 106.

In step 623, VPN Gateway 106 receives the routing preference request from User Device 102 and forwards it to Comm Listener 115.

In step 625, Comm Listener 115 receives the routing preference request from User Device 102. It then forwards this request to Route Controller 114.

In step 627, Route Controller 114 receives the routing preference request from User Device 102 and formulates an appropriate routing rule that corresponds to User Device 102 preference. In one embodiment, User Device 102 made a preference to reach Target One 130 not via SVPNS One 122 as defined in the default routing and executed in the previous data exchange cycles in steps 209-219, but via SVPNS Two 124. In other words, User Device 102 expressed a preference to reroute its traffic via SVPNS Two 124. Route Controller 114 identifies this preference and makes a routing rule to that effect that it forwards to VPN Gateway 106.

In one example, the embodiments begin the routing with the first SYN packet received or, in the case of UDP, a stateful NAT can be employed to route traffic.

In step 629, after the routing preference has been implemented at VPN Gateway 106, User Device 102 makes a request to access a domain Target One 130 (the same target as in the previous data exchange cycles) and sends it to VPN Gateway 106.

In step 631, VPN Gateway 106 receives the data request from User Device 102 and selects the preferred routing to an exit VPN server that was selected by User Device 102. In this data exchange cycle, VPN Gateway 106 cannot choose SVPNS One 122 as the exit VPN server (as per default routing) and routes the request to SVPNS Two 124.

In step 633, SVPNS Two 124 makes a request to Target One 130 for the data specified in the request from User Device 102. The type of data can be an HTTP response, a streaming service or any other media or data entity. The applications of the current embodiments are not limited by a particular protocol or the type of target that is being accessed.

In step 635, Target One 130 returns the data specified in the original request from User Device 102 to SVPNS Two 124.

In step 637, SVPNS Two 124 forwards the data received from Target One 130 to VPN Gateway 106.

In step 639, VPN Gateway 106 returns the request data to User Device 102 over the existing VPN tunnel.

The data exchange described in steps 629 and 639 forms a complete cycle and can be reiterated multiple times before any changes are made to the existing communication. The rates of the cycle are flexible and can include, for example, one, one hundred, one thousand or ten thousand instances. However, during this cycle, User Device 102 sends all requests to PVPNS 104 and they are routed via SVPNS Two 124. This type of connection constitutes a multiserver VPN connection.

FIG. 6B shows the continuation of the exemplary flow diagram of server defined and user defined multiserver routing.

In step 641, VPN Gateway 106 forwards unencrypted data packets from User Device 102 to Packet Processor 110. These data packets can be forwarded individually, as a constant stream or they can be aggregated and only forwarded when a certain number of packets is reached or at preset intervals. The forwarding and the further analysis of the packets and the aggregated traffic can take place asynchronously with the previous data exchange cycle. This means that the transfer of data for analysis can be constant or happen at the same time or independently from the data exchange cycle that forwards and executes requests by User Device 102. The differentiation of data exchange cycles into asynchronous processes ensures that the requests of User Device 102 can be executed without waiting for any other processes to finish and thus no delays occur. Likewise, analysis can happen at the same time that the requests are executed.

In step 643, Packet Processor 110 processes the data packets. Processing of data packets refers to extracting certain information from data packets. The extracted information can be indicative of locations or countries of origin and target, network connection type, also dynamic parameters, like timestamps, session duration, timestamps of idleness, a session's total traffic, response time, latency; such data can also include aggregated dynamic parameters over any period of time (average speed, average data packet size, average response time, average latency, most/least visited targets, error rate, variations in which median and percentile groups are used instead of average values, and others) in any combination and with any weights associated with the parameters. In most applications of the current embodiments, the goal of processing data packets is to arrive at an aggregated data model that is suitable for matching with existing routing strategies. Packet Processor 110 can save aggregation conclusions about the data packets as metadata.

In step 645, Packet Processor 110 forwards the processed data packets or metadata regarding them to Traffic Analyzer 112. Traffic Analyzer 112 uses the received data (whether in processed data packet form or metadata form) to match it with existing routing strategies that will determine the secondary (exit) VPN server.

Traffic Analyzer 112 should have a set of routing strategies performed in a flow of information exemplified in FIG. 3, steps 301 and 303.

The processing load is distributed between Packet Processor 110 and Traffic Analyzer 112. In some embodiments, the needed data features can be extracted at one entity or the other without changing the overall functionality of the embodiments. For example, Packet Processor 110 can aggregate data without extracting features and Traffic Analyzer 112 can extract features or Packet Processor 110 can already have relevant features processed before forwarding it to Traffic Analyzer 112.

Traffic Analyzer 112 matches traffic with strategies based on an algorithm that does not change the overall functionality of the embodiments. Analysis can take as parameters protocols used for the connections within the traffic information, target IP addresses, their ranges and locations, and target ports can be indicative of particular types of services accessed. Any type of algorithm could be implemented that matches particular traffic with the optimal routing strategy. Examples of algorithmic operations include but are not limited to grouping data in categories, forming series of data (ordered, partially ordered or unordered), aggregating data, extracting aggregated results, performing statistical analysis, running machine learning and deep learning algorithms, forming predictive models, and other processing functions. Traffic Analyzer 112 can run multiple related mechanisms that determine the outcome together.

Steps 641-645 form a complete cycle of information transfer in the case in which a strategy match is not found for the relevant traffic. In other words, if no match is found by Traffic Analyzer 112 for processed data packets, then no decision to change routing is made and the default routing remains valid. In such a case, however, packets will continue to be analyzed for future potential matches and steps 641-645 can be reiterated. If a match is found, then the following actions are performed.

In step 647, Traffic Analyzer 112 communicates the matching strategy to Route Controller 114. The information communicated from Traffic Analyzer 112 to Route Controller 114 can be indicative of the secondary (exit) VPN server that should be used for optimal routing of this particular traffic. In the current embodiment, the optimal secondary (exit) VPN server is SVPNS Three 126.

In step 649, Route Controller 114 receives the routing strategy from Traffic Analyzer 112 and formulates an appropriate routing rule that corresponds to the routing strategy. In one embodiment, the strategy indicates to reach Target One 130 not via SVPNS Two 124 as defined in user preference and executed in the previous data exchange cycles in steps 629-639, but via SVPNS Three 126. In other words, Traffic Analyzer 112 found a strategy that matched the analyzed traffic that shows that it is optimal to reroute the traffic via SVPNS Three 126. Route Controller 114 identifies this strategy and makes a routing rule to that effect that it forwards to VPN Gateway 106.

In one example, the embodiments begin the routing with the first SYN packet received or, in the case of UDP, a stateful NAT can be employed to route traffic.

In step 651, after the routing strategy has been implemented at VPN Gateway 106, User Device 102 makes a request to access a domain Target One 130 (the same target as in the previous data exchange cycles) and sends it to VPN Gateway 106.

In step 653, User Device 102 makes a data request for Target One 130.

In step 655, VPN Gateway 106 receives the data request from User Device 102 and selects the preferred routing to an exit VPN server that was indicated in a routing strategy. In this data exchange cycle, VPN Gateway 106 does not choose SVPNS Two 124 as the exit VPN server and routes the request to SVPNS Three 126. It is desirable that the communication takes place over an encrypted protocol, like a VPN tunnel, so that the data exchanged is encrypted and cannot be intercepted.

FIG. 6B shows the continuation of the exemplary flow diagram of server defined and user defined multiserver routing.

In step 657, SVPNS Two 124 makes a request to Target One 130 for the data specified in the request from User Device 102. The type of data can be an HTTP response, a streaming service or any other media or data entity. The applications of the current embodiments are not limited by a particular protocol or the type of target that is being accessed.

In step 659, Target One 130 returns the data specified in the original request from User Device 102 to SVPNS Two 124.

In step 661, SVPNS Two 124 forwards the data received from Target One 130 to VPN Gateway 106.

In step 663, VPN Gateway 106 returns the request data to User Device 102 over the existing VPN tunnel.

The data exchange described in steps 653 and 663 forms a complete cycle and can be reiterated multiple times before any changes are made to the existing communication. The rates of the cycle are flexible and can include, for example, one, one hundred, one thousand or ten thousand instances. However, during this cycle, User Device 102 sends all requests to PVPNS 104 and they are routed via SVPNS Three 126. This type of connection constitutes a multiserver VPN connection.

The current exemplary embodiments describe how multiple decisions can be implemented within the VPN service provider infrastructure. However, in a different configuration, the decision order could be reversed. For example, the data exchange cycle could begin by a server defined multiserver routing (steps 641-651) and then be changed by user defined multiserver routing (steps 621-627). The setting of which preference should have priority is a simple configuration in the VPN service infrastructure and it does not change the overall functionality of the embodiments. The order of these steps can be synchronous, asynchronous or partially synchronous, depending on the configuration of the VPN service provider infrastructure. In at least some embodiments, the user preference is not changed by server defined traffic analysis. In at least one instance, the user preference disables the traffic analysis and steps 641-663 are not performed.

Likewise, both user defined and server defined routing preferences can be applied to full traffic or partial traffic as described in FIG. 5, steps 521-555. For example, the user could select a preference to redirect part of the traffic through other than optimal multiserver routing identified by a strategy or by default routing.

However, these are trivial changes to the overall structure of the embodiments that show how multiple decisions can be incorporated into a single unified method and system.

A combination of the flows of action described above comprises a method for multihop or multiserver routing for a VPN connection. Parts of the flows can happen synchronously or asynchronously. The method overall comprises receiving, at an entry VPN server from a user device, a first request for connection to a first target, forwarding, at the entry VPN server, the first request through a first exit VPN server, aggregating, at the entry VPN server, data activity packets from the first request into traffic information, matching, at the entry VPN server, the user device's traffic information with routing strategy to route traffic through a second exit VPN server, different from the first exit VPN server, assigning, at the VPN server, the routing strategy to the second request to route traffic through a second exit VPN server, receiving, at the entry VPN server from the user device, a second request for connection to the first target or to a second target, different from the first target, and forwarding, at the entry VPN server, the second request through a second exit VPN server.

The method is also adapted for and compatible with two or more routing strategies that are matched simultaneously with different parts of traffic from the user device, part of the traffic from the user device being routed via the first exit VPN server and another part, that does not include traffic from the first part, being routed via the second exit VPN server, routing strategies being generated based on on at least one of the following: used protocols, target IP addresses, and target ports, receiving, at the VPN server, an instruction from the user device to route requests through a third exit VPN server, different from the first exit VPN server, receiving, at the entry VPN server from the user device, a third request for connection to the first target or to a second target, different from the first target, forwarding, at the entry VPN server, the third request through the third exit VPN server, different from the first exit VPN server, instructions including a reference to a geographic location of the third exit VPN server, entry VPN server receiving updated routing strategies from an application programming interface, data transfer between the entry VPN server and any of the exit VPN servers happening over an encrypted connection, and the second request being associated with a different domain than a domain of the first request, traffic analysis taking place at the same time that the first request and the second request are routed.

Figure 7:
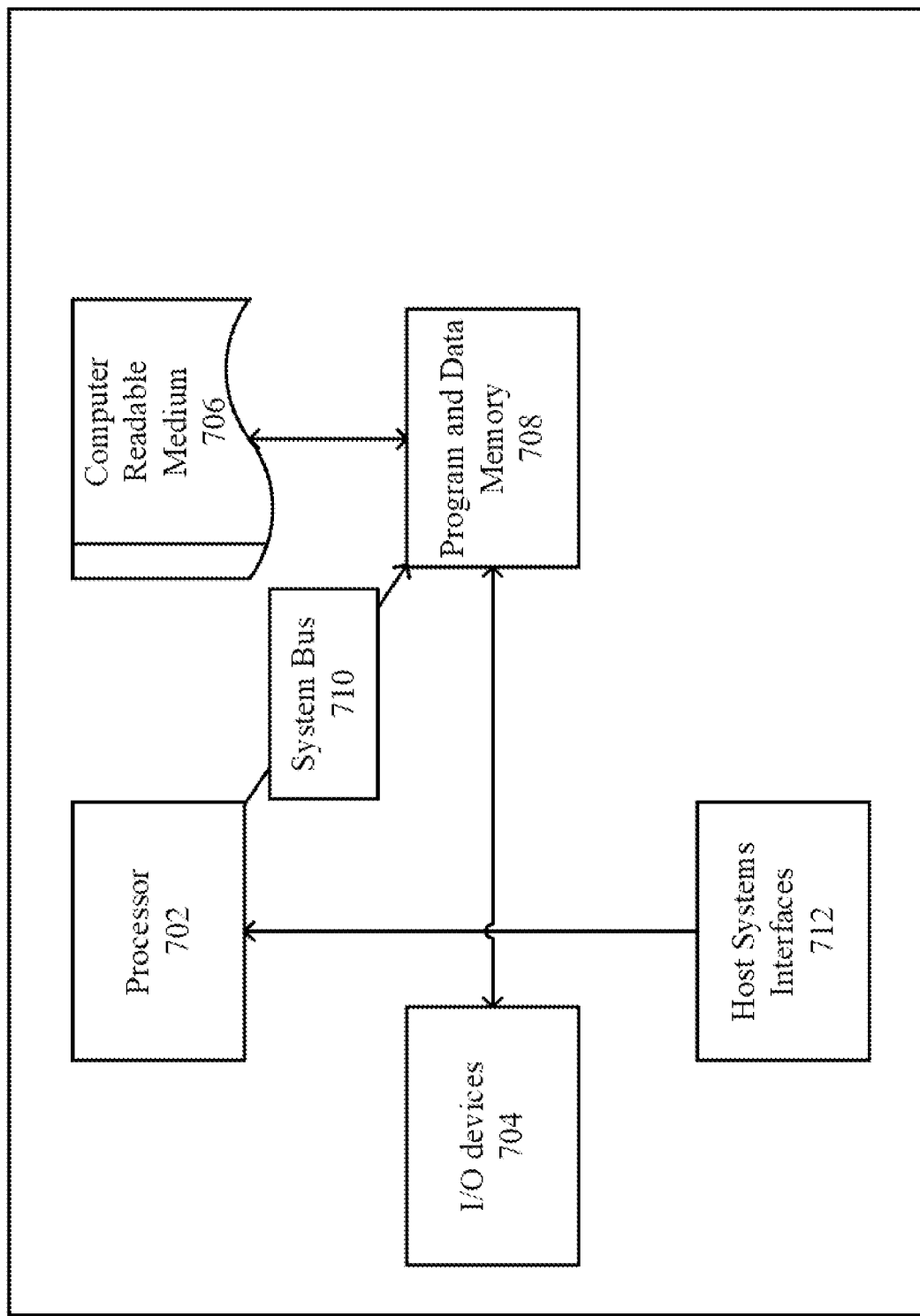
FIG. 7 shows a computing system in which a computer readable medium may provide instructions for performing any of the methods and processes disclosed herein.

The embodiments herein may be combined in a variety of ways as a matter of design choice. Accordingly, the features and aspects herein are not intended to be limited to any particular embodiment. Furthermore, the embodiments can take the form of hardware, firmware, software, and/or combinations thereof. In one embodiment, such software includes but is not limited to firmware, resident software, microcode, etc. FIG. 7 illustrates a computing system 700 in which a computer readable medium 706 may provide instructions for performing any of the methods and processes disclosed herein.

Furthermore, some aspects of the embodiments herein can take the form of a computer program product accessible from the computer readable medium 706 to provide program code for use by or in connection with a computer or any instruction execution system. For the purposes of this description, the computer readable medium 706 can be any apparatus that can tangibly store the program code for use by or in connection with the instruction execution system, apparatus, or device, including the computing system 700.

The computer readable medium 706 can be any tangible electronic, magnetic, optical, electromagnetic, infrared, or semiconductor system (or apparatus or device). Some examples of a computer readable medium 706 include solid state memories, magnetic tapes, removable computer diskettes, random access memories (RAM), read-only memories (ROM), magnetic disks, and optical disks. Some examples of optical disks include read only compact disks (CD-ROM), read/write compact disks (CD-R/W), and digital versatile disks (DVD).

The computing system 700 can include one or more processors 702 coupled directly or indirectly to memory 708 through a system bus 810. The memory 708 can include local memory employed during actual execution of the program code, bulk storage, and/or cache memories, which provide temporary storage of at least some of the program code in order to reduce the number of times the code is retrieved from bulk storage during execution.

Input/output (I/O) devices 704 (including but not limited to keyboards, displays, pointing devices, I/O interfaces, etc.) can be coupled to the computing system 700 either directly or through intervening I/O controllers. Network adapters may also be coupled to the computing system 700 to enable the computing system 700 to couple to other data processing systems, such as through host systems interfaces 712, printers, and/or storage devices through intervening private or public networks. Modems, cable modems, and Ethernet cards are just examples of network adapter types.

Although several embodiments have been described, one of ordinary skill in the art will appreciate that various modifications and changes can be made without departing from the scope of the embodiments detailed herein. Accordingly, the specification and figures are to be regarded in an illustrative rather than a restrictive sense, and all such modifications are intended to be included within the scope of the present teachings. The benefits, advantages, solutions to problems, and any element(s) that may cause any benefit, advantage, or solution to occur or become more pronounced are not to be construed as a critical, required, or essential feature or element of any or all the claims. The invention is defined solely by the appended claims including any amendments made during the pendency of this application and all equivalents of those claims as issued.

Moreover, in this document, relational terms such as first and second, and the like may be used solely to distinguish one entity or action from another entity or action without necessarily requiring or implying any actual such relationship or order between such entities or actions. The terms "comprises", "comprising", "has", "having", "includes", "including", "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element preceded by "comprises . . . a", "has . . . a", 'includes . . . a", "contains . . . a" does not, without additional constraints, preclude the existence of additional identical elements in the process, method, article, and/or apparatus that comprises, has, includes, and/or contains the element. The terms "a" and "an" are defined as one or more unless explicitly stated otherwise herein. The terms "approximately", "about" or any other version thereof, are defined as being close to as understood by one of ordinary skill in the art. A device or structure that is "configured" in a certain way is configured in at least that way, but may also be configured in ways that are not listed. For the indication of elements, a singular or plural form can be used, but it does not limit the scope of the disclosure and the same teaching can apply to multiple objects, even if in the current application an object is referred to in its singular form.

It will be appreciated that some embodiments describe the use of one or more generic or specialized databases (such as "Exit Nodes Database", or similar), that contains a collection of information that is organized so that it can be easily accessed, managed and updated. Computer databases typically contain aggregations of data records or files, in the current case, databases usually store different information and statistics about the proxies or exit nodes, information about utilization threshold of the exit node provider. Such databases can also contain information about the users, requests performed, networks used, exit nodes used, types of exit nodes requested and similar data. Databases are structured to facilitate the storage, retrieval, modification, and deletion of data in conjunction with various data-processing operations.

The Disclosure is provided to allow the reader to quickly ascertain the nature of the technical disclosure. It is submitted with the understanding that it will not be used to interpret or limit the scope or meaning of the claims. In addition, in the foregoing Detailed Description, it is demonstrated that multiple features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method for routing a VPN connection, comprising:
   maintaining, between an entry VPN server and a device, a single VPN connection;
   receiving, from the device, a first traffic and a second traffic;
   forwarding the first traffic from the entry VPN server to a first exit VPN server and the second traffic from the entry VPN server to a second exit VPN server;
   aggregating data activity packets from the first traffic into first traffic information; and
   assigning a configuration strategy to the device based on the first traffic information for routing the first traffic information through the second exit VPN server.

2. The method of claim 1, wherein the second traffic originates from the device after the first traffic.

3. The method of claim 1, wherein the configuration strategy is generated based on at least one of used protocols, target IP addresses, or target ports.

4. The method of claim 1, wherein the first traffic is directed to a first target, and the second traffic is directed to the first target or to a second target that is different from the first target.

5. The method of claim 4, comprising:
   receiving, from the device, instructions to route at least one of the first traffic or the second traffic through a third exit VPN server;
   receiving, from the device, a third traffic that is directed to the first target or to the second target; and
   forwarding the third traffic through the third exit VPN server.

6. The method of claim 5, wherein at least one of the first traffic, the second traffic, or the third traffic includes at least one of TCP datagrams or UDP datagrams.

7. The method of claim 5, wherein the instructions include a reference to a geographic location of the third exit VPN server.

8. The method of claim 5, wherein data transfer between the entry VPN server and the first exit VPN server, the second exit VPN server, or the third exit VPN server is conducted over an encrypted connection.

9. The method of claim 1, comprising:
   receiving an updated configuration strategy from a centralized data channel for a service provider infrastructure.

10. The method of claim 1, wherein the second traffic is associated with a different domain than a domain of the first traffic.

11. The method of claim 1, wherein the data activity packets of the first traffic are aggregated while the first traffic is routed.

12. A computing apparatus for routing a VPN connection, the apparatus comprising:
    one or more processors; and
    a memory coupled to the one or more processors, the memory storing computer executable instructions that, when executed by the one or more processors, operate the computing apparatus to:
    maintain, between an entry VPN server and a device, a single VPN connection;
    receive, from the device, a first traffic and a second traffic;
    forward the first traffic from the entry VPN server to a first exit VPN server and the second traffic from the entry VPN server to a second exit VPN server;
    aggregate data activity packets from the first traffic into first traffic information; and assign a configuration strategy to the device based on the first traffic information for routing the first traffic information through the second exit VPN server.

13. The computing apparatus of claim 12, wherein the configuration strategy is generated based on at least one of used protocols, target IP addresses, or target ports.

14. The computing apparatus of claim 12, wherein the first traffic is directed to a first target, and the second traffic is directed to the first target or to a second target that is different from the first target.

15. The computing apparatus of claim 14, wherein the computer executable instructions operate the computing apparatus to:
   receive, from the device, instructions to route at least one of the first traffic or the second traffic through a third exit VPN server;
   receive, from the device, a third traffic that is directed to the first target or to the second target; and
   forward the third traffic through the third exit VPN server.

16. The computing apparatus of claim 15, wherein data transfer between the entry VPN server and the first exit VPN server, the second exit VPN server, or the third exit VPN server is conducted over an encrypted connection.

17. A non-transitory computer-readable medium comprising stored computer-executable instructions that are configured to:
   maintain, between an entry VPN server and a device, a single VPN connection;
   receive, from the device, a first traffic and a second traffic;
   forward the first traffic from the entry VPN server to a first exit VPN server and the second traffic from the entry VPN server to a second exit VPN server;
   aggregate data activity packets from the first traffic into first traffic information; and
   assign a configuration strategy to the device based on the first traffic information for routing the first traffic information through the second exit VPN server.

18. The non-transitory computer-readable medium of claim 17, wherein the configuration strategy is generated based on at least one of used protocols, target IP addresses, or target ports.

19. The non-transitory computer-readable medium of claim 17, wherein the first traffic is directed to a first target, and the second traffic is directed to the first target or to a second target that is different from the first target, and wherein the computer-executable instructions are configured to:
   receive, from the device, instructions to route at least one of the first traffic or the second traffic through a third exit VPN server;
   receive, from the device, a third traffic that is directed to the first target or to the second target; and
   forward the third traffic through the third exit VPN server.

20. The non-transitory computer-readable medium of claim 19, wherein data transfer between the entry VPN server and the first exit VPN server, the second exit VPN server, or the third exit VPN server is conducted over an encrypted connection.

* * * * *